(12) United States Patent
Mishra et al.

(10) Patent No.: US 11,497,177 B2
(45) Date of Patent: Nov. 15, 2022

(54) COMPOSITIONS AND METHODS RELATING TO FUNCTIONALIZED SANDS

(71) Applicant: KING ABDULLAH UNIVERSITY OF SCIENCE AND TECHNOLOGY, Thuwal (SA)

(72) Inventors: Himanshu Mishra, Thuwal (SA); Joel Reihmer, Thuwal (SA); Adair Gallo, Jr., Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 640 days.

(21) Appl. No.: 16/332,651

(22) PCT Filed: Oct. 5, 2017

(86) PCT No.: PCT/IB2017/056157
§ 371 (c)(1),
(2) Date: Mar. 12, 2019

(87) PCT Pub. No.: WO2018/091986
PCT Pub. Date: May 24, 2018

(65) Prior Publication Data
US 2020/0253138 A1    Aug. 13, 2020

Related U.S. Application Data

(60) Provisional application No. 62/550,264, filed on Aug. 25, 2017, provisional application No. 62/404,958, filed on Oct. 6, 2016.

(51) Int. Cl.
*A01G 24/42* (2018.01)
*A01G 24/30* (2018.01)
(Continued)

(52) U.S. Cl.
CPC ............ *A01G 24/42* (2018.02); *A01G 24/15* (2018.02); *A01G 24/22* (2018.02); *A01G 24/30* (2018.02); *C09K 17/52* (2013.01); *A01G 25/00* (2013.01)

(58) Field of Classification Search
CPC ........ A01G 24/42; A01G 24/30; A01G 24/15; A01G 24/22; A01G 25/00; A01G 24/35;
(Continued)

(56) References Cited

U.S. PATENT DOCUMENTS 3,108,441 A * 10/1963 Watson ................. C09K 17/14
405/264
4,925,493 A   5/1990 Lamoreaux
(Continued)

FOREIGN PATENT DOCUMENTS

CN    1061988 A    6/1992
CN    1069046 A    2/1993
(Continued)

OTHER PUBLICATIONS

Daniel Hillel, "Introduction of Soil Physics", Academic Press, 1982, pp. xiii-364.
(Continued)

*Primary Examiner* — Christopher D Hutchens
*Assistant Examiner* — Steven J Shur
(74) *Attorney, Agent, or Firm* — Patent Portfolio Builders PLLC

(57) ABSTRACT

Described herein are compositions and methods relating to functionalized sands or soils.

16 Claims, 19 Drawing Sheets

(51) Int. Cl.
    *A01G 24/15*     (2018.01)
    *A01G 24/22*     (2018.01)
    *C09K 17/52*     (2006.01)
    *A01G 25/00*     (2006.01)

(58) Field of Classification Search
CPC ..... C09K 17/52; C09K 17/40; C04B 2111/27; C04B 30/00; C04B 20/1044; Y02A 40/22
See application file for complete search history.

(56) References Cited

U.S. PATENT DOCUMENTS

| | | | |
|---|---|---|---|
| 5,472,458 A | 12/1995 | Ogawa et al. | |
| 6,235,070 B1 | 5/2001 | Beermann | |
| 7,160,379 B1 * | 1/2007 | Shoshany | C08L 91/06 |
| | | | 106/271 |
| 8,067,059 B2 * | 11/2011 | Birger | C09C 3/08 |
| | | | 427/204 |
| 8,765,857 B2 * | 7/2014 | Fujimaru | A01G 24/00 |
| | | | 524/427 |
| 2002/0055556 A1 | 5/2002 | Schubert et al. | |
| 2018/0014476 A1 * | 1/2018 | Shah | A01G 25/00 |

FOREIGN PATENT DOCUMENTS

| | | |
|---|---|---|
| CN | 1194956 A | 10/1998 |
| CN | 1042344 C | 3/1999 |
| CN | 1104390 C | 4/2003 |
| CN | 103283577 A | 9/2013 |
| CN | 103290832 A | 9/2013 |
| CN | 103304173 A | 9/2013 |
| CN | 103306260 A | 9/2013 |
| CN | 104449755 A | 3/2015 |

OTHER PUBLICATIONS

G. McHale et al., "Liquid marbles: topical context within soft matter and recent progress", Soft Matter, 2015, pp. 2530-2546, vol. 11.

Jim Bilskie, "Soil water status: content and potential", Campbell Scientific, Inc., 2001, p. 1.

Mohammed A. Salem et al., "Water Conservation and Management with Hydrophobic Encapsulation of Sand", Water Resour. Manage., 2010, pp. 2237-2246, vol. 24.

Nachiketa Janardan et al., "Liquid marbles: Physics and applications", Sadhana, May 2015, pp. 653-671, vol. 40, Part 3.

Odile Carrier et al., "Evaporation of water: evaporation rate and collective effects", Journal of Fluid Mechanics, 2016, pp. 774-786.

P. Jish Prakash et al., "The impact of dust storms on the Arabian Peninsula and the Red Sea", Atmos. Chem. Phys., 2015, pp. 199-222, vol. 15.

Pierre-Gilles De Gennes et al., "Capillarity and Wetting Phenomena", 2003, pp. 1-287.

Raju Adhikari et al., "Novel sprayable biodegradable polymer membrane to minimise soil evaporation", 2015 International Conference on Technologies for Sustainable Development, Feb. 4-6, 2015, pp. 1-4, Mumbai, India.

Ronald M. Atlas, "Microbial Degradation of Petroleum Hydrocarbons: an Environmental Perspective", Microbiological Reviews, Mar. 1981, pp. 180-209, vol. 45, No. 1.

Subrahmaniyan Kasirajan et al., "Polyethylene and biodegradable mulches for agricultural applications: a review", Agron. Sustain. Dev., 2012, pp. 501-529, vol. 32.

Yair Kaufman et al., "Simple-to-Apply Wetting Model to Predict Thermodynamically Stable and Metastable Contact Angles on Textured/Rough/Patterned Surfaces", Journal of Physical Chemistry, 2017, pp. 5642-5656.

Benoit Laborie et al., "How coatings with hydrophobic particles may change the drying of water droplets: incompressible surface versus porous media effects", Soft Matter, 2013, pp. 4822-4830, vol. 9.

Food and Agriculture Organization, FAO, Aquastat website, 2016, retrieved from the internet: http://www.fao.org/aquastat/en, website accessed on Jul. 5, 2019.

E Various: "The Hindoo Sand Trick" in: "The Boy Mechanic Book 2, 1000 Things For A Boy To Do," Jan. 1, 1915, vol. 76, p. 308.

International Search Report in corresponding/related International Application No. PCT/IB2017/056157, dated Feb. 26, 2018.

Written Opinion of the International Searching Authority in corresponding/related International Application No. PCT/IB2017/056157, dated Feb. 26, 2018.

\* cited by examiner

COMPOSITIONS AND METHODS RELATING TO FUNCTIONALIZED SANDS

CROSS-REFERENCE TO RELATED APPLICATIONS

The present application is a U.S. National Stage of International Application No. PCT/IB2017/056157, filed Oct. 5, 2017, which claims priority to U.S. Provisional Patent Application Ser. No. 62/550,264, filed Aug. 25, 2017 and U.S. Provisional Patent Application Ser. No. 62/404,958, filed Oct. 6, 2016, the entire disclosures of which are both hereby incorporated by reference.

TECHNICAL FIELD

The present disclosure generally relates to compositions and methods to functionalize sands or soils, and in an aspect compositions and methods relating to hydrophobic sands or soils as described herein.

BACKGROUND

Desert areas pose a number of challenges in regards to water and storms. For example sufficient sources for useable water, in particular desalinated water, and its use for agriculture, is a challenge. Storms, in particular dust and sand storms pose a further challenge.

Two of the biggest environmental and economic challenges for desert agriculture are: (1) large consumption of water due to intense evaporation and imbibition in the soil, and (2) deposition of common salts, e.g. NaCl, in the top soil from partially salty irrigation water (also known as sodication of soil). One way to meet these challenges is through surface modifications of sand or soil in and around agricultural systems that can "functionalize" sand or soil. These modifications, such as improving the hydrophobicity of inherently hydrophilic sand or soil, allow improved water retention and decreased salt deposition by employing functionalized sand or soil into agricultural systems. Functionalized sand or soil also can be used in desalination processes to produce water suitable for use in agriculture and to reduce the severity of dust or sand storms.

Current technologies exist for functionalizing and modifying the surface properties of sand. These technologies, such as the use of organosilanes to improve hydrophobicity, are very costly. They also suffer other drawbacks from an ease-of-use perspective. These issues prevent the widespread adoption and implementation of functionalized sand into desert agricultural systems. Accordingly, there is a need to address the aforementioned deficiencies and inadequacies and to address the aforementioned challenges.

SUMMARY

Provided herein are methods for making a functionalized sand or soil and a functionalized sand or soil composition and also methods of use of the functionalized sand or soil composition. The composition can, inter alia, be for use in agricultural systems, including desert agricultural systems, in producing desalinated water via membrane distillation, and in reducing the severity of dust and sand storms.

Described herein, in an embodiment, is a method of making a modified sand or soil. As used herein, sand can mean "soil" and vice versa, or both. The method can result in making a functionalized sand, a functionalized soil, or a composition comprising both a functionalized sand and a functionalized soil. The method of making the modified sand and/or soil can comprise: providing an unmodified sand or soil or both; dissolving a modifying agent, such as wax, into a solvent to create a modification mixture, such as a wax solution; mixing the unmodified sand and/or soil with modification mixture; incubating the unmodified sand and/or soil and modification mixture for a length of time, at a temperature or varying temperature, and at a pressure or a varying pressure to create the modified sand and/or soil. In any one or more aspects, the method can further include evaporating the solvent; condensing the evaporated solvent to re-create a liquid solvent; and storing the liquid solvent in a storage vessel. As used herein, when reference is made to "sand or soil" it should be understand that this can also include a combination of both sand and soil.

In an embodiment, the method of producing superhydrophobicity in sand or soil can comprise the steps of: a) obtaining a sand or soil composition; b) washing the sand or soil composition; c) drying the sand or soil composition; d) obtaining a wax; e) dissolving the wax into a solvent to form a wax solution; e) adding the sand or soil composition to a container; f) adding the wax solution to the container; g) mixing the wax solution and the sand or soil composition within the container at a first pressure (P1) and at a first temperature (T1) for a first period of time (t1); h) bringing the mixture up to but under a boil, or alternatively up to a slow boil, over another time period (t3); and i) subsequently maintaining the mixture at a constant pressure for a final time period (t4) to form said superhydrophobic sand or soil including the sand or soil composition coated with wax.

In an embodiment, the method can further include the steps of: reducing the first pressure (P1) in the container to a second pressure (P2) that is lower than the first pressure (P1) over a second time period (t2), the second time period (t2) being less than that of the first time period (t1); reducing the second pressure (P2) in the container at a constant rate over the third period of time (t3) to a third pressure (P3), the third period of time (t3) being longer than the second period of time (t2) and the third pressure (P3) being lower than the second pressure (P2); once reaching the third pressure (P3) maintaining the pressure in the container at the third pressure (P3) for the fourth and final period of time (t4); and normalizing the pressure in the container from the third pressure (P3) up to atmospheric pressure to form said superhydrophobic sand or soil including the sand or soil composition coated with wax.

In any one or more aspects of the method, the sand or soil composition can comprise a plurality of particles comprising one or more of $SiO_2$, $CaCO_3$, $Al_2O_3$, $Fe_2O_3$, $TiO_2$, $P_2O_5$, $K_2O$, $CaO$, $MgO$, $Na_2O$, and/or $MnO_2$ and wherein each of the particles has a maximum dimension of less than about 600 μm. The method can further include filtering the sand or soil particles after drying the sand and adding the filtered sand or soil particles to the container, wherein the filtering isolates sand or soil particles having a longest dimension of about 600 μm or less. The drying can be performed with a thermal convection oven, using sunlight, or using natural wind convection, individually or in combination. The step of obtaining the wax can include preparing the wax by grating or shaving the wax, individually or in combination, and using about 1 mL of solvent to 2 g of particles. The container can be a rotary evaporator and the container is able to support a reduced pressure reduced to about 10 mbar and optionally contains one or more baffles to aid in the mixing of the wax solution and the sand composition within the container. The wax solution and sand or soil composition can be present in the container in a proportion of about 1:200 to about 1:200 grams of wax to grams of sand or more than 1:200 grams of wax to grams of soil. The mixing can be performed by the rotary evaporator rotating at a rate of about 10 to about 150 rpm. The first temperature (T1) can be about 40° C. to about 55° C., and below the melting point of the wax. The first pressure (P1) can be about 1000 mbar, or one atmosphere, of pressure. The first period of time (t1) can be about 1 minute to about 5 minutes. The first temperature (T1) can be about 40° C. and wherein during the step of reducing the second pressure (P2) to the lower pressure (P3) the temperature can be raised from said first temperature (T1) to a second temperature (T2) of about 55° C. The second pressure (P2) can be about 100 mbars to about 900 mbars. The third pressure (P3) can be about 10 mbars to about 500 mbars. The second period of time (t2) can be up to about 2 minutes. The third period of time (t3) can be about 5 to about 25 minutes. The fourth time period (t4) can be about 1 to about 5 minutes. The third period of time (t3) can be selected to be slow enough to prevent boiling or rapid boiling of the wax solution in the container. The third period of time (t3) and the third pressure (P3) can be selected to bring the mixture to a boil (to slow boil or up to a boil without actually boiling). The solvent can be selected from the group consisting of diethyl ether, pentane, dichloromethane, and combinations thereof. The solvent can be selected from the group consisting of methyl-t-butyl ether (MBTE), petroleum ether (ligroin), chloroform, tetrahydrofuran (THF), hexane, cyclohexane, triethyl amine, gasoline, toluene, and mixtures thereof.

In any one or more aspects, the methods described herein can use beach sand, desert sand, or any other source of sand or soil with smaller particle sizes such as silt or clay. The modifying agents as used herein can be comprised of wax. The wax can be common wax, paraffin wax, soy wax, palm wax, or bees wax, among others, individually or in combination.

In various embodiments, a functionalized sand and/or soil composition is also described herein. The composition can be a surface modified sand or soil, modified to change the surface to a superhydrophobic surface. The modifying agent can be a wax as described further herein. The functionalized sand and/or soil composition can be a composition made by any one or more of the methods described herein.

In an embodiment, the modified composition of sand or soil can include one or more particles of sand or soil. The one or more particles of sand or soil can have a size, and the surface of the particles can be coated with a functionalizing agent such as a hydrophobic layer. The composition of sand or soil with particles having a hydrophobic layer can have a liquid roll off angle of about 3 to 7 degrees, about 4 to 6 degrees, or about 5 degrees, for a layer of modified sand or for one or more particles themselves. The curvature of the liquid meniscus at the solid-vapor interface can have a contact angle, $\theta_0 < 90°$.

In any one or more aspects, the size of the one or more particles can be about 75 µm to about 150 µm, and the one of more particles can be comprised of $SiO_2$, $CaCO_3$, $Al_2O_3$, $Fe_2O_3$, $TiO_2$, $P_2O_5$, $K_2O$, Cao, MgO, $Na_2O$, or $MnO_2$. The sand or soil particles to be modified can be desert sand or beach sand, or any other type of sand or soils with smaller particle sizes such as silt or clay. The sand or soil can be modified to include a hydrophobic layer that can coat the surface of one or more of the particles. The hydrophobic layer can be a wax layer. The wax layer can be a layer of common wax, paraffin wax, palm wax, bees wax, and soy wax, individually or in combination. In one or more aspects, the modified composition of sand or soil can comprise a hydrophobic or a superhydrophobic sand or soil mulch including the modified sand or soil particles. The ratio of wax to sand or soil an be in the range of 1:200 to 1:2000 grams of wax to grams of sand, or more than 1:200 grams of wax to grams of silt or clay soils, providing a thin hydrophobic layer of wax consistently over the surface of the particles. In various aspects the thickness of the wax on the particles can be about 100 nm or less, about 80 nm or less, about 60 nm or less, about 40 nm or less, about 35 nm or less, about 30 nm or less, or about 20 nm or less. The thickness of the wax on the sand or soil particles can be in the range of about 10 nm to about 100 nm or anywhere in between, for example, about 10 nm to about 80 nm, about 10 nm to about 60 nm, about 10 nm to about 40 nm, about 15 nm to about 35 nm, or about 20 nm to about 30 nm, preferably about 20 nm.

Also described herein are methods for reducing irrigation requirements for an agricultural system. In one or more aspects, the methods can include providing a layer of the aforementioned mulch on top of agricultural top soil. In an aspect, the thickness of the mulch can range from 2 mm to about 20 mm, for example about 3-5 mm, on top of the soil. In an embodiment, the methods can comprise: tilling soil within an agricultural system, wherein the tilled soil has one or more apexes and one or more troughs, wherein a difference in height exists between the one or more apexes and the one or more troughs; planting one or more seeds in the one or more troughs of the tilled soil; and distributing the aforementioned modified sand in any one or more of its aspects on the one or more apexes of the tilled soil. The method can further include irrigating the tilled soil.

Also described herein are methods of reducing fertilizer leaching. In an embodiment the method of reducing fertilizer leaching can comprise: distributing a layer of modified sand or soil according to any one or more aspects of the present disclosure throughout an agricultural system; distributing a layer of soil on top of the layer of modified sand, soil, and/or the mulch; distributing fertilizer throughout the layer of soil; and planting seeds in the layer of soil. The method can further include irrigating the soil.

Further described herein is a method of reducing evaporation in a field. In an embodiment, the method of reducing evaporation in a field can comprise: providing a layer of soil; planting seeds in the layer of soil; irrigating the layer of soil; and distributing modified sand, soil, and/or the mulch according to the present disclosure on top of the soil.

Also described herein is a method of resisting forces generated by one or more flows of fluid. In an embodiment the method can comprise: making a modified sand according to any one or more of the aspects of the present disclosure; providing the modified sand or soil; and placing the modified sand on a surface subject to forces generated by one or more flows of fluid.

Also described herein is a fluid filter. In an embodiment, the fluid filter can comprise a modified sand or soil containing modified sand or soil particles according to any one or more of the aspects of the present disclosure; a container with pores configured to receive and hold the modified sand or soil, wherein the pores have a cross-sectional area smaller than a maximal average cross-sectional area of the modified sand or soil particles; wherein the container is configured to receive a fluid with a concentration of ions and/or particulate matter; and wherein the container is configured to pass the fluid through the modified sand or soil and discharge the fluid from the filter. In one or more aspects, the fluid filter can be used as the membrane in a membrane distillation process as further described below.

Also described herein is a method of resisting fluid percolation and water loss in soils. In an embodiment, the method can comprise: having a modified sand or soil made according to any one or more of the aspects of the present disclosure; providing the modified sand or soil; and placing the modified sand or soil under a layer of 10 cm to 2 µm of soil.

Also described herein is a method of resisting corrosion and preserving materials. In an embodiment, the method can comprise: having a modified sand or soil made according to any one or more of the aspects of the present disclosure; providing the modified sand or soil; and placing the modified sand or soil around the objects to be protected against corrosion.

Also described herein is a method of thermally insulating structures. In an embodiment, the method can comprise: having a modified sand or soil made according to any one or more of the aspects of the present disclosure; providing the modified sand or soil; and placing the modified sand or soil around the objects to be insulated against thermal loss of gain.

Other systems, methods, features, and advantages of the present disclosure for systems and methods for compositions and methods relating to inexpensive functionalized sands or soils, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7A is a picture of the pots used for ambient-condition evaporation experiment. All the pots have the same amount of soil (75 g) and the same initial amount of water (132 g). Positioning the pots in (x,y) matrix, the pots at the bottom left [(1,1),(1,2)] have a layer of wax-coated beach sand, [(1,3), (1,4), (1,5), (2,1)] have a top layer of hydrophobic sand mixed with soil, [(2,2), (2,3)] have a hydrophobic layer (outer ring) and a normal sand layer (central circle), [(2,4), (2,5), (3,y), (4,1), (4,2), (4,3)] have a normal sand layer on top, [(4,4), (4,5), (5,y), (6,1), (6,2), (6,3)] have a hydrophobic sand layer and [(6,4), (6,5)] have no sand layer. Pots in the same category have different thicknesses of the hydrophobic sand layer acting as a mulch. FIG. 7B illustrates experimental results to compare the evaporative losses from common soil (soils that are not treated with wax, in this example the soil layer beneath the superhydrophobic sand) saturated with water using different thicknesses of layers of normal sand, hydrophobic sand and bare soil. Temperatures ranged from 26 to 48° C. and relative humidity from 14 to 93% with an average of 48%. The initial time corresponds to 9:45 a.m. on Oct. 10, 2016. The study compares evaporation loss from common soil saturated with water using different thicknesses of the layers of normal sand, hydrophobic sand and bare soil.

FIG. 17A shows an experimental setup where a fan was placed at a distance from a petri dish containing sand. FIG. 17B shows results for the experiment comparing normal sand, hydrophobic sand and hydrophobic sand baked (after being exposed to 50° C. for 24 h). It can be noted that the mass of sand lost due to the wind is greater for the normal sand when compared to the hydrophobic sands. The wind velocity was qualitatively measure based on the distance between the blower and the petri dish containing sand.

DETAILED DESCRIPTION

Figure 1A:
FIG. 1A depicts a photograph of hydrophobic sand with water wherein the water is not able to penetrate the sand.

Described below are various embodiments of compositions and methods relating to functionalized sands or soils, including hydrophobic sands or soils, and their uses according to the present disclosure. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of sample preparation, water analysis, water filtration, mathematical modeling, and the like, which are within the skill of the art. Such techniques are explained fully in the literature.

It is to be understood that, unless otherwise indicated, the present disclosure is not limited to particular methods of functionalizing sands or soils and functionalized sand or soil compositions or functionalized soils with smaller particle sizes, in particular methods and compositions for hydrophobic sands, or the like, and their uses as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

"Common soil" or "common soils" as used herein refers to sands or soils that are not treated with wax.

"Rapid boil" or "rapid boiling" as used herein refers to a boil that is performed under higher difference of actual pressure and vapor pressure, provoking a more vigorous bubbling of the liquid, solvent, aqueous solution, aqueous suspension, and the like.

"Slow boil" or "slow boiling" as used herein refers to a boil that is done when the actual pressure is closer to the vapor pressure, provoking a gentler (less vigorous) bubbling.

Description

The present disclosure is directed to compositions and methods relating to functionalized sands and/or soils and functionalized sand and/or soil compositions, for example hydrophobic sands, and their uses such as in, inter alia, agriculture, producing desalinated water via membrane distillation, and reducing dust and sand storms. In an aspect, the functionalized soils can have smaller particle sizes than the functionalized sands. As used herein, sand can mean "soil" and vice versa, or both.

Previous work has attempted to make hydrophobic sands with waxes, such as: U.S. Pat. No. 7,160,379[1], CN103306260 B[2], CN1104390 C[3], U.S. Pat. No. 6,235,070B1[4], among others. Some require melting of wax followed by mixing with sand. Methods as described in U.S. Pat. No. 7,160,379[1] despite its high thermal and mechanical requirements, do not provide a uniform coating of wax over sand grains; lack of a uniform coating lends the functionalized sand unable to resist water for long periods of time, and the hydrophobicity of the sand tends to fail starting at 60 minutes.

The processes in the literature above which utilize the melted wax to coat sand either require a very high quantity of wax, leading to diminishing returns based on cost, or produce bad quality coating because the wax does not form a uniformly distributed layer on the surface of the sand grains, which is the case for the cited patent U.S. Pat. No. 7,160,379[1] and also for the other references[1-11] that rely on the same methodology of melting wax and mixing with sand to hydrophobize it.

It is worth mentioning that the present process for making sand hydrophobic only uses 1 g of wax per 200 g of sand, or even less, of sand (good results were obtained even when 1 g of wax per 2000 g of sand was used). The process cited in U.S. Pat. No. 7,160,379[1] claims to use from 0.01 to 10% (weight ratio of wax blend to total coated sand weight). However, the present process was able to effectively use 0.050% wax (1 g of wax per 2000 g of sand) for beach sand particles sieved for sizes <600 µm, and yet truly make hydrophobic sand. Thus, the present process uses much less wax and is able to make a hydrophobic sand composition that can serve as a much with a more homogeneous coating.

Chinese patent CN103304173 B[12] creates a solution of wax and toluene which is then mixed with common sand in a rotary evaporator. The toluene is evaporated and recovered, but the amount of wax required makes the disclosed method financially impractical due to the cost of materials and the quality of coating provided.

Other researchers have exploited paraffin wax by heating it up to 80 degrees and adding sand to it. (CN 103290832). This process is mired with difficulties, such as (i) high energy consumption due to a requirement that high temperature be used to melt the wax, (ii) dealing with high-viscosity wax, (iii) thick wax coatings on sand, which might increase overall costs and processing time, and (iv) lack of homogenous coating of the sand surface with the wax. The dynamic viscosity of paraffin wax can vary by a factor in the range 7-3 mPa-s as the temperature changes from 60-100° C. This means that a precise control of temperature is critical in the reference mentioned above to avoid the potential of jamming the mixing impellers or pipes/columns.

A strategy to coat polystyrene (PS) on sand by dissolving PS in toluene has also been reported. (CN 103283577). It, too, has challenges. For example, it requires use of high temperature and pressure to separate the toluene solvent from the solute mixture. It also requires a relatively large amount of the PS to coat the sand, for example 10 g of PS to 30 kg of as compared to the present disclosure. Accordingly, there exists a need in the art for improvements relating to functionalized sand or soil.

In various aspects, described herein is a surface modification to sand or soil for the functionalization of the sand or soil. As described herein, the sand can be common sand, or common soils with smaller particle sizes, and can comprise a mixture of particles made of various minerals. Sand as described herein can be sand that is found on beaches or in deserts, or in soils with low organic matter content. Sand compositions can be volcanic in origin. Minerals that can form particles of common sand or common soils (silt and clay) or other sand compositions can include quartz ($SiO_2$), aragonite ($CaCO_3$), alumina ($Al_2O_3$), iron oxide ($Fe_2O_3$), and titania ($TiO_2$). As used herein, sand can refer to common sand or silt or clay soils, other compositions of sand or soil, particles of sand or soil, grains of sand or soil, or a composition with particles and/or grains of sand or soil.

In various aspects, the sand or soil can be 0.75-600 micron sized particles and anywhere there between, such as silica beads (hollow or solid), or silt. Particles of sand as described herein can be sized in length from about 0.75 μM to about 150 μM. Particles of sand or soil as described herein can have a diameter of about 600 μM or less, 500 μM or less, 400 μM or less, 300 μM or less, 200 μM or less, for example in the range of 75 μM to about 150 μM. As used herein, particle size can refer to a length, a diameter, a radius, a circumference, a width, a height, or other physical dimension. Sand or soil particles can be approximately spherical and can have an average distance from one sand or soil particle to another in a composition of sand or soil. Sand or soil compositions and particles can be inherently hydrophilic with a contact angle of water $\theta_0 < 90°$ without any modifications to the particles within.

In various aspects, described herein are sand or soil compositions that have sand grains or soil particles with modified surfaces and hydrophobic properties to functionalize the sand or soil. Particles of sand or soil as described herein can be functionalized or modified to alter their surface properties. Surface properties of sand or soil particles can be modified with a surface modification agent to create modified or functionalized sand or soil. Sand or soil compositions as described herein can have modified surface properties that render the surface of the sand or soil more hydrophobic. Sand or soil compositions as described herein can have modified surface properties that raise their coefficient of friction. Sand or soil compositions with a modified surface as described herein can have a higher coefficient of friction than unmodified sand or soil that imparts resistance to forces of fluid flow. Sand or soil compositions with a modified surface as described herein can have a higher Laplace pressure generated by the particles of the composition. Sand or soil compositions with a modified surface as described herein can have a higher Laplace pressure and impede the flow of a fluid. Sand or soil compositions with a modified surface as described herein can have a higher Laplace pressure and impede the flow of liquid water, while permitting the flow of water vapor between particles.

In various aspects, the sand or soil can be a hydrophobic sand or soil that is modified to alter the way the sand or soil particles interact with water. A hydrophobic substance can be applied to the surface of the sand or soil particles. Sand or soil particles can be coated with a hydrophobic substance to modify their surface properties so that the particles repel water in order to create a hydrophobic sand or soil. Sand or soil particles can be coated with a hydrophobic substance to modify their surface properties so that a composition of modified sand or soil has a higher Laplace pressure generated by the particles therein. The surface of sand or soil particles in a modified or hydrophobic sand can be modified so that they have a contact angle $\theta_0$ with water of greater than 90°, $\theta_0 > 90°$, for example >95°, >100°, >105°, or >110°. The coating of the particles can be a thin coating. In one or more aspects, the coating of the hydrophobic substance can have a thickness of approximately 100 nm of the wax or less, for example 50 nm, 40 nm, 30 nm, 20 nm or less. In one or more aspects, a hydrophobic and/or superhydrophobic sand or soil mulch can be formed or comprised of the modified sand or soil.

In various aspects, described herein is a method of imparting a surface modification onto particles of sand or soil. Modified or hydrophobic sand or soil can be modified with a hydrophobic substance, In any one or more aspects, the hydrophobic substance sand or soil particles can be coated with a wax in a thin layer to modify the sand or soil, such as that described above. In an embodiment, sand or soil particles are coated with a thin layer of hydrophobic common wax. In various aspects, a commercially available paraffin wax with the general formula $C_nH_{2n+2}$, where n>20 can be used to coat the surface of the sand or soil. In other embodiments, sand particles can be coated with an alternative to common wax. In any one or more aspects, the wax can have a boiling point of 65° C. or higher. Other hydrophobic alternatives to common wax can be paraffin wax, bees wax, soy wax, or palm wax. For example, sand or soil particles can be coated with paraffin wax soy wax, beeswax, candle wax and/or palm wax to functionalize the surface of the sand or soil to increase its hydrophobic or non-wetting properties or surface co-efficient of friction.

On the other hand, processes as described herein can involve dilute solutions of the wax, such as paraffin wax, in a solvent such as dichloromethane (an inexpensive solvent with a low dynamic viscosity (~0.4 mPa·s) under ambient conditions. The resulting solutions have low viscosity that are not stable within ±10° C. of the ambient conditions. Low viscosity implies lower energy cost during mixing. Lastly, the solvent can be regenerated after a batch of sand or soil has been coated with ~100 nm thick layer of wax for the next batch.

Methods as described herein can impart a surface modification onto particles of sand or soil by coating the particles with a substance, such as a hydrophobic substance, at a temperature, or over a range of temperatures, and a pressure, or over a varying range of decreasing pressures. In an aspect, the temperature and pressure can be room temperature and standard pressure. Room temperature can be about 25° C. Room temperature can be about 20-25° C. Room temperature can be about 20-28° C. Standard pressure can be about 1 atm or 1 bar.

In an aspect, the methods as described herein can be accelerated through the use of heat and/or altered or varying reduced, or negative, pressure. The temperature can be over a range of about 40° C. to about 55° C. The pressure can be a negative pressure (meaning that the method can be operated under vacuum). The method can be started at a first pressure (P1) during a first stage, then reduced during a second stage to a lower pressure (P2), and subsequently reduced again to yet a lower pressure (P3) during a third stage. The pressure can be varied from about 1000 mbar during the first stage to about 10 mbar during the third stage to affect the superhydrophobic coating of the sand or soil.

The ratio of sand or soil to hydrophobic substance (also known as a modifying agent as used herein) can be about 1:200 to about 1:2000, about 1:300 to about 1:1000, about 1:400 to about 1:800, or preferably about 1:600 grams of modifying agent (e.g., wax) to grams of sand. For soils such as clay or silt with smaller particles sizes, the ratios can be calculated based on total particle area to be coated.

The equation $m_{wax} = \tau \cdot \rho_{wax} \cdot m_{soil} \cdot A_{BET}$ can be used to estimate the mass of wax ($m_{wax}$) needed for a given soil mass ($m_{soil}$), with BET surface area of the soil ($A_{BET}$), density of wax ($\rho_{wax}$) and desired thickness of coating ($\tau$). Where the minimum thickness required can be 10 nm, but higher values such as 20, 50 or 100 nm are preferred to guarantee a homogeneous coating, accounting for the uncertainties in the measurements and surface chemistries. When the BET area is not available, its value can be estimated using $A_{BET} = 6/(d \cdot \rho_{wax} \cdot \Psi)$, where d is the average particle size of sand or soil, and W is the average sphericity of the particles.

Herein, an inexpensive solvent (such as mentioned above) can be employed to dissolve wax (with or without any external heat) and coat the surface of the sand or soil particles with a nanoscale thickness of the wax, i.e. less than 100 nm thick (as described above). Furthermore, the solvent can be recovered and regenerated in the process to be used over and again.

A surface modification agent (or hydrophobic substance or modifying agent) can be used in conjunction with a solvent to modify the surface of sand or soil particles. The surface modification agent can be a hydrophobic substance that can coat sand or soil particles. The surface modification agent can be a hydrophobic wax, such as common wax, paraffin wax, bees wax, soy wax, or palm wax. In an embodiment, the surface modification agent is paraffin wax. In an embodiment of the method, paraffin wax is used in conjunction with a solvent to coat sand or soil particles and impart hydrophobic properties to the particles.

Figure 21:
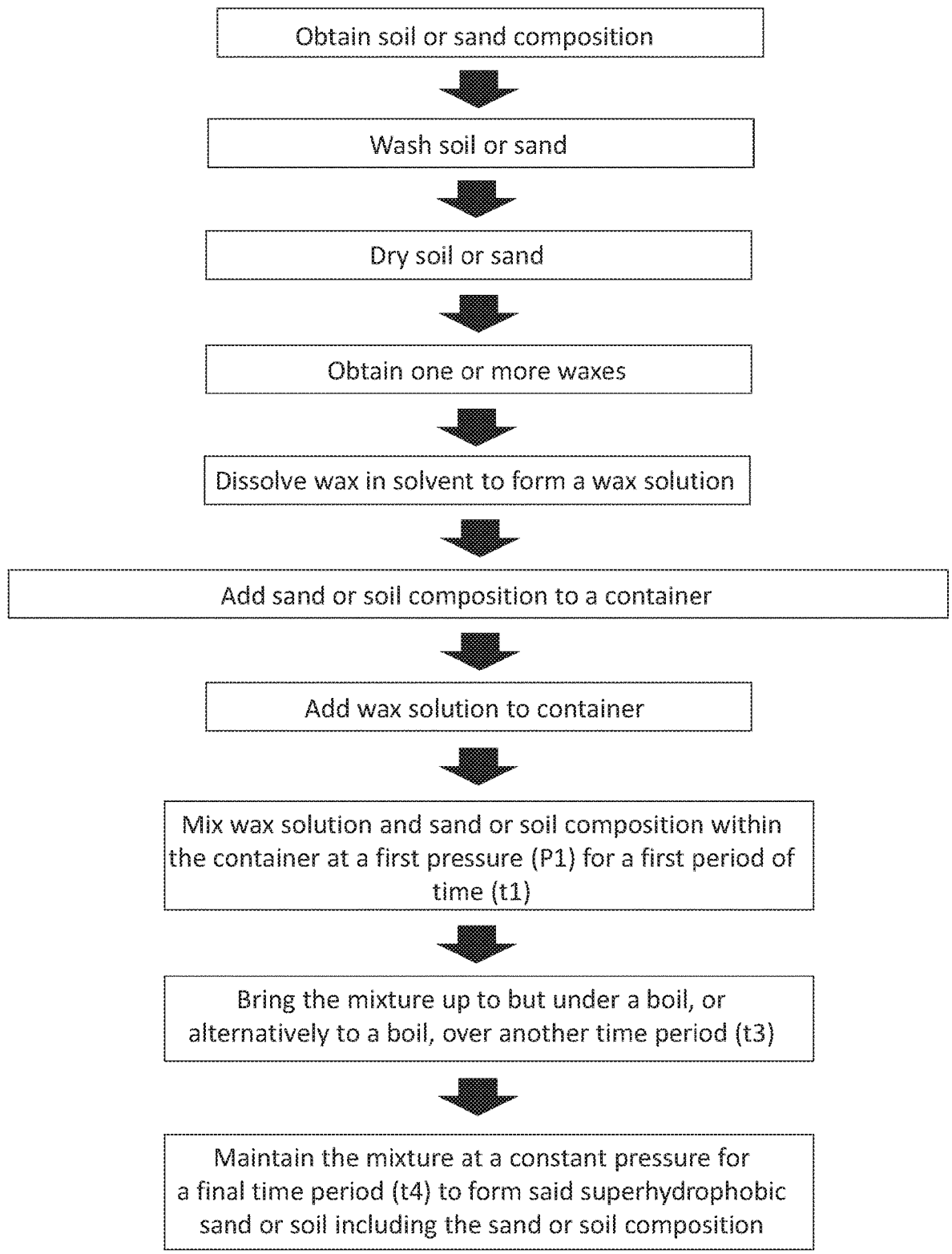
FIG. 21 is a flowchart depicting an embodiment of a method of making functionalized sand and/or soil as described herein.

With reference to FIG. 21, in an embodiment, the method of producing superhydrophobic sand or soil can comprise the steps of: a) obtaining a sand or soil composition; b) washing the sand or soil composition; c) drying the sand or soil composition; d) obtaining a wax; e) dissolving the wax into a solvent to form a wax solution; e) adding the sand or soil composition to a container; f) adding the wax solution to the container; g) mixing the wax solution and the sand or soil composition within the container at a first pressure (P1) and at a first temperature for a first period of time (t1); h) bringing the mixture up to but under a boil, or alternatively up to a boil over another time period (t3), for example up to a slow boil; and i) subsequently maintaining the mixture at a constant pressure for a final time period (t4) to form said superhydrophobic sand or soil including the sand or soil composition coated with wax.

Figure 22:
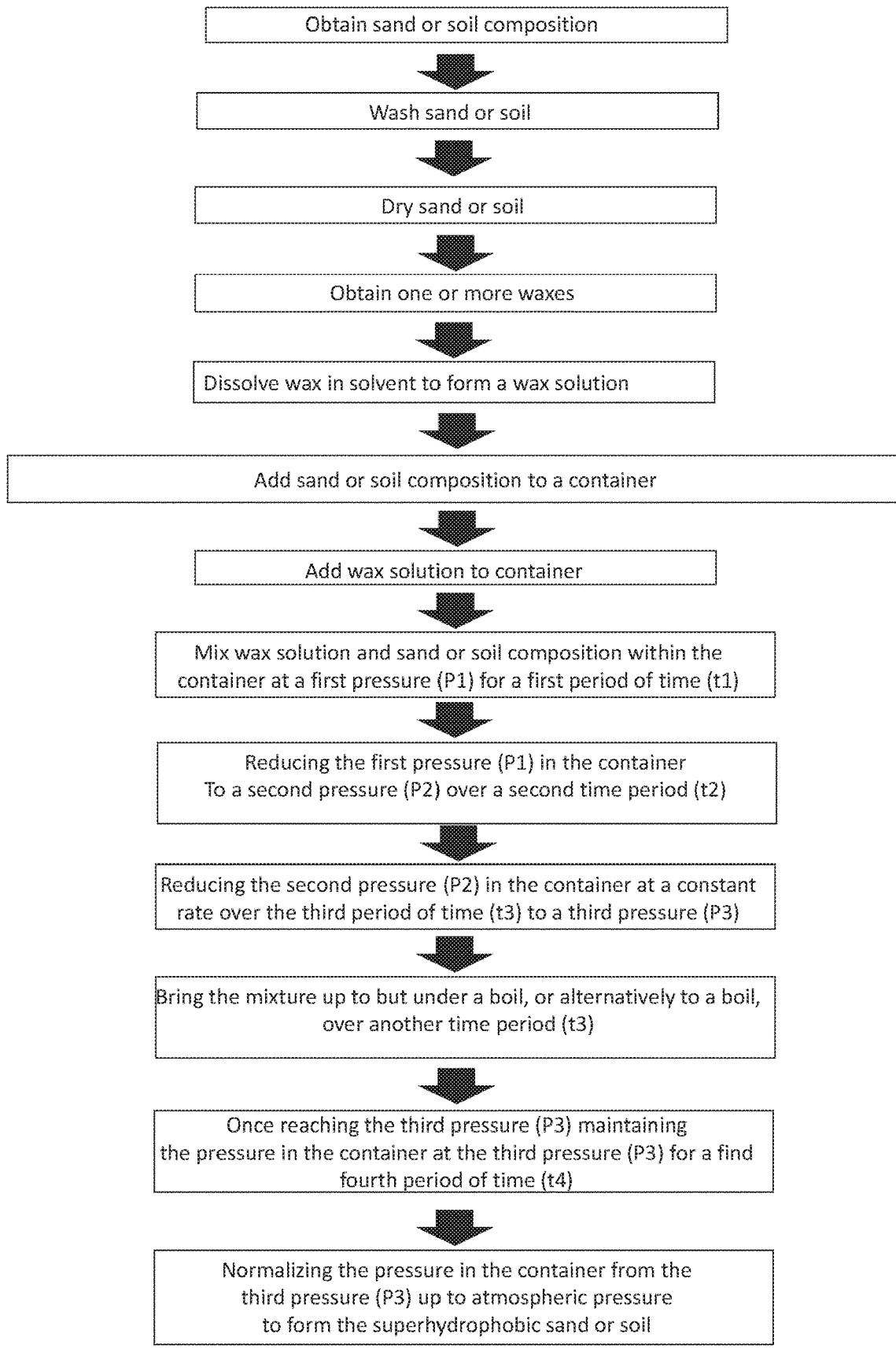
FIG. 22 is a flowchart depicting another embodiment of a method of making functionalized sand and/or soil as described herein.

As illustrated in FIG. 22, in an embodiment, the method can further include the steps of: reducing the first pressure (P1) in the container to a second pressure (P2) that is lower than the first pressure (P1) over a second time period (t2), the second time period (t2) being less than that of the first time period (t1); reducing the second pressure (P2) in the container at a constant rate over the third period of time (t3) to a third pressure (P3), the third period of time (t3) being longer than the second period of time (t2) and the third pressure (P3) being lower than the second pressure (P2); once reaching the third pressure (P3) maintaining the pressure in the container at the third pressure (P3) for the fourth and final period of time (t4); and normalizing the pressure in the container from the third pressure (P3) up to atmospheric pressure to form said superhydrophobic sand or soil including the sand or soil composition coated with wax.

The solvent can be allowed to evaporate. The evaporated solvent can be condensed with a condensation system combined with a collection and/or storage system and recycled for later use. Evaporation of the solvent can leave a thin layer of the surface modification agent, such as a hydrophobic wax on the sand or soil, producing a hydrophobic sand or soil that can repel water. The thin layer can be 100 nm or less, as described herein. The recovery of the solvent can be reduced in time by applying heat and an amount of vacuum.

In various aspects, described herein is a method to reduce or prevent water evaporation in agricultural systems. Agricultural systems as described herein can have soil, an irrigation source, a light source, and optionally fertilizer. Agricultural systems as described herein can be irradiated and have a source of light, such as the sun or from bulbs in a lamp. Agricultural systems as described herein may be exposed to the environment (i.e. outdoors) or may be shielded from the elements (i.e. indoor, such as in a greenhouse or within another structure). Agricultural systems as described herein may be within a structure that is elevated from the ground. In an embodiment, an agricultural system is a field (that can have soil) with an irrigation source that is irradiated by the sun, as one would find on a farm, and can optionally have fertilizer. In one or more aspects, the method can include distributing a layer of the aforementioned superhydrophobic sand or soil mulch over agricultural topsoil.

The present functionalized sand or functionalized soils, in particular the present hydrophobic sand, such as sand as described above, can be used in agricultural systems to reduce water loss by evaporation. The hydrophobic sand or soil can be used as a mulch. It can, for example, be used in agricultural systems and placed on top of topsoil to reduce evaporation. The hydrophobic sand or soil can be used in agricultural systems to reduce or prevent penetration of water beyond the hydrophobic layer when placed underneath (or more subterranean) layers of top soil or other layers of soil or ground. The hydrophobic sand or soil can be used in agricultural systems to direct water via gravity towards planted seeds, roots, or other plant constituents that are planted in or above the ground.

The hydrophobic sand or soil can be used in agricultural systems to reduce or prevent the deposition of common salts (such as NaCl) due to salty (or desalinated or partially desalinated water) in topsoil. The hydrophobic sand or soil can be used like a mulch, or in place of a mulch, and can be used in agricultural systems to reduce or prevent deposition of minerals, metals, metalloids, heavy metals, alloys, elements, bacteria, fungi, or other constituents of impure water on top soil. The hydrophobic sand or soil can be used to prevent passage of salts. In other aspects, the functionalized sand or soil described herein can have an increased coefficient of friction to reduce it from being blown away in high winds such as during a desert sand storm.

Examples

Now having described various embodiments of the disclosure, in general, the examples describe some additional embodiments. While embodiments of the present disclosure are described in connection with the examples and the corresponding text and figures, there is no intent to limit embodiments of the disclosure to these descriptions. On the contrary, the intent is to cover all alternatives, modifications, and equivalents included within the spirit and scope of embodiments of the present disclosure An inexpensive surface modification method of common sand or soil, for example sand found in deserts, beaches, or arid regions, using common wax, e.g. paraffin, bees, soy or palm wax, to render the sand hydrophobic was demonstrated (FIG. 1A). The hydrophobic sand or soil can be used to reduce water consumption in desert or arid land agriculture. Demonstrated herein are compositions and methods that address both the aforementioned challenges of excessive water consumption and deposition of common salts elegantly and with minimal expense. The material and methods can be placed (1) above (i.e., on top of) the soil to prevent water evaporation, and (2) under the soil at a depth, d, comparable to twice of the root depth, $d_r$, to present a barrier to water from penetrating deeper.

Example 1

Figure 1B:
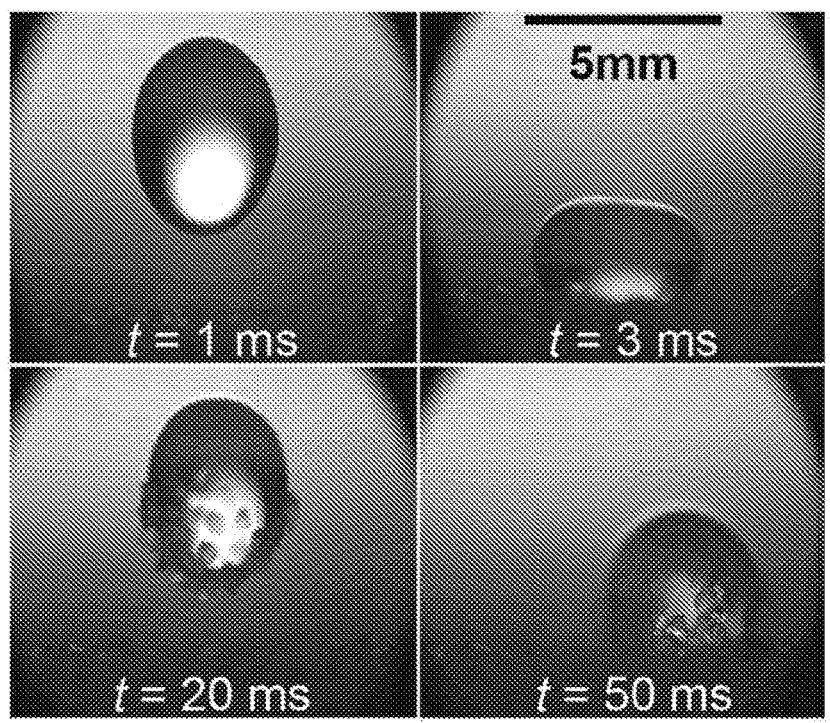
FIG. 1B are high-speed micrographs of a water drop (2 µL) impinging on a packed bed of hydrophobic sand from a height of 2 cm.

The technology disclosed herein entails an inexpensive surface modification method of common sand or common soils with low organic matter content, for example found in deserts, beaches, or arid regions, using common wax, e.g. paraffin, bees, soy or palm wax, to render it superhydrophobic. A variety of applications are proposed herein for the superhydrophobic material including desert agriculture, home gardening, liquid marbles, water proofing, corrosion-prevention, thermal insulation, water desalination and reducing intensity of sand storms. Since the present superhydrophobic sand or soil is robust, non-toxic, inexpensive, and effectively repels water, it should fulfill all other applications claimed for similar granular media, comprising of sand or soil and wax[1-4, 6]. (FIGS. 1A and 1B)

Figure 2:
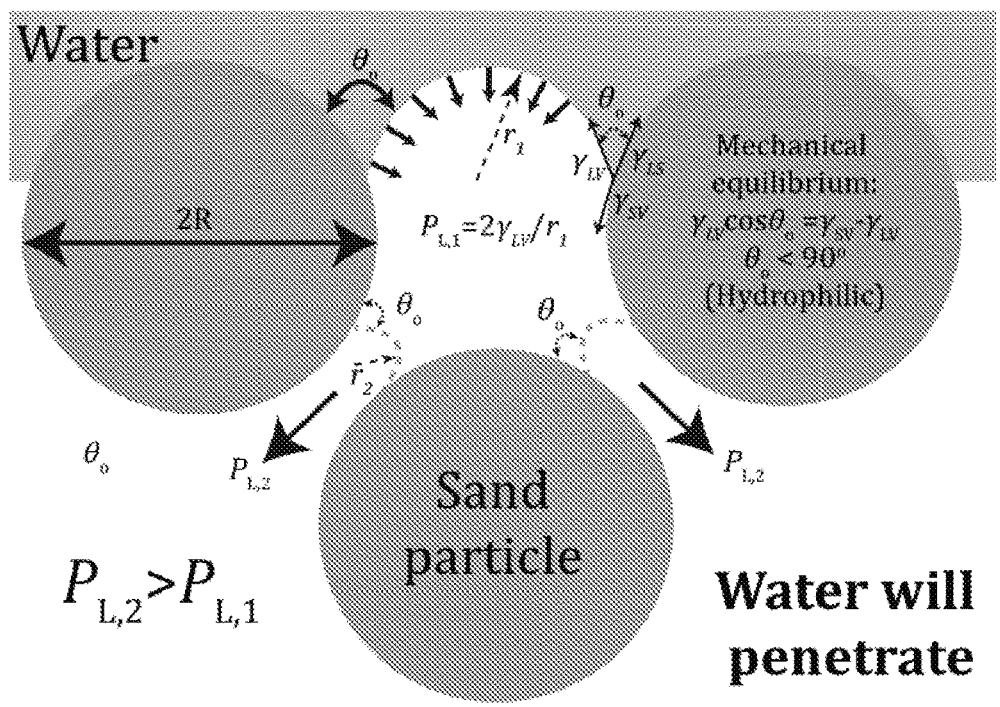
FIG. 2 depicts how water imbibes in granular sand media and its inherently hydrophilicity. Since sand comprises primarily of silica and calcite, the contact angle of water $\theta_0<90°$. Thus, as water comes in to contact with, approximately spherical, sand particles the mechanical equilibrium between interfacial tensions leads to a concave liquid meniscus. This curvature creates a capillary pressure, also known as the Laplace pressure, that drives water inward. An approximate magnitude of this pressure can be estimated by considering sand particles to be approximately spherical with diameters 75 µm<d<150 µm and spacing, $P_L=2\gamma_{LV}\times\cos\theta_0/r_2\approx6-600$ kPa, where $\gamma_{LV}=73$ mN/m is the surface tension of the air-water interface and $r_2=20$ µm to 200 nm is a possible range for the radio of curvature due to multiscale roughness of grains.

Sand or soil is intrinsically a hydrophilic porous medium due to polar Si—O—H bond and chemistries that ensue when water is placed on it.[13] For instance, sand in the Saudi Arabian peninsula is a complex granular mixture of minerals, including mainly quartz ($SiO_2$), aragonite ($CaCO_3$), alumina ($Al_2O_3$), iron oxide ($Fe_2O_3$) and titania ($TiO_2$) with particle sizes, 75 μm<l<750 μm.[14] To get a fair idea of the wettability of sand by water, we measured advancing and receding contact angles of water on smooth and flat silica, the major constituent of sand, in air, and found them to be, $\theta_{Adv}=\theta_{Rec}\approx 35°$. Now, we try to understand what happens when a drop of water lands on ordinary sand—we expect that the mechanical equilibrium between interfacial tensions would lead to a concave meniscus, which satisfy the equilibrium contact angle, $\theta_0\approx\theta_{Adv}=\theta_{Rec}\approx 35°$ (FIG. 2). This curvature creates a capillary pressure, known as the Laplace pressure that drives water into the granular sand matrix. A magnitude of the Laplace pressure can be estimated by considering sieved sand particles to be approximately spherical with diameters 75 μm<d<150 μm and with spacing as shown in FIG. 2, which yields, $P_L=2\gamma_{LV}\times\cos\theta_0/r_2\approx 6\text{-}600$ kPa, where $\gamma_{LV}=73$ mN/m is the surface tension of the air-water interface, $\theta_0\approx 35°$ is the intrinsic/equilibrium contact angle at the wax-water-vapor interface, and $r_2=200$ nm-20 μm is an expected range for the radii of curvature due to multiscale roughness of grains as shown in FIG. 2. In short, this model calculation explains why ordinary sand readily imbibes water.

Figure 3A:
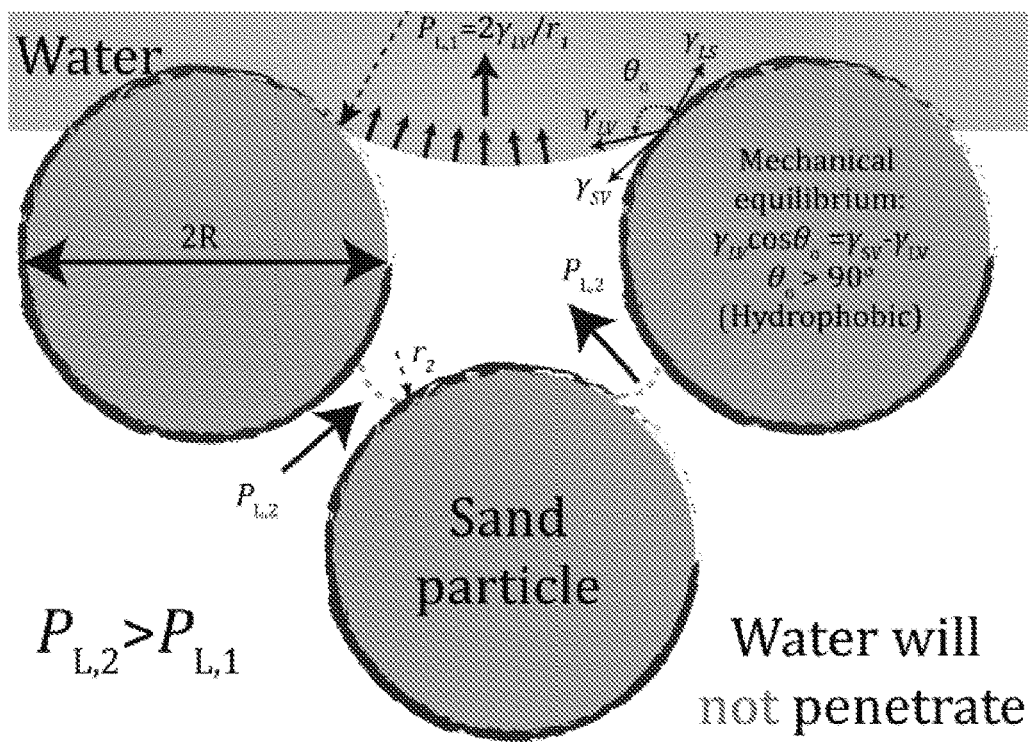
FIG. 3A depicts how water imbibition will be prevented in surface-modified hydrophobic granular (sand or soil) media. Typical contact angle of water on wax is, $\theta_0\approx105°$. Thus, the air-water interface in contact with sand or soil particles will form a convex meniscus due to the mechanical equilibrium of interfacial tensions. This curvature creates a Laplace pressure that prevents imbibition of water into superhydrophobic sand or soil.

It can be hypothesized that if sand or soil could be rendered hydrophobic (i.e. $\theta_0>90°$), the curvature of the water meniscus at the solid-vapor interface will be opposite to curvature of water in contact with ordinary sand or soil (compare FIGS. 2 and 3A). Typically, smooth hydrocarbon surfaces have an intrinsic contact angle for the air-water interface, $\theta_0\approx 105°$. Thus, following the abovementioned logic and approximates, we estimate the magnitude of the Laplace pressure as, $P_L=2\gamma_{LV}\times\cos\theta_0/r_2\approx 1.9\text{-}190$ kPa, which will prevent inhibition of water inward.

Methods for Coating the Sand or Soil:

In an embodiment, to render common sand or soil superhydrophobic, the following protocol can be applied:

1. Sand from KAUST beach was tested and soil from the Makkah region in Saudi Arabia were tested. Other sands or soils, such as those described above, can be used;

2. The sand or soil was washed with water to remove organics, soluble solids and surfactants;

3. The sand or soil was dried in a thermal convection oven at 100° C. for 6 to 24 h. This step can also be done using sunlight and natural wind convection to reduce the costs in an industrial application;

4. Mechanical sieving was used to isolate sand or soil grains with size <600 μm; This step is not required, but the sand or soil with smaller grain size, results in better hydrophobicity;

5. Blocks of paraffin wax are grated to sizes of the order of <1 mm to make wax shavings;

6. The wax shavings are dissolved into an organic solvent (diethyl ether, pentane, dichloromethane, methyl-t-butyl ether (MTBE), petroleum ether (ligroine), chloroform, tetrahydrofuran (THF), hexane, cyclohexane, triethyl amine, gasoline or toluene) in order to make a wax solution. The solvent to sand or soil ratio can be in the order of 1 mL of solvent to 2 g of sand or soil;

7. The sieved sand or soil is then added to an appropriate container, for example a rotary evaporator; preferably this container is able to support vacuum and a pressure to about 10 mbar. It can also contain one or more baffles in order to provide homogenous mixing of the wax solution and sand or soil during evaporation;

8. The wax solution is then added to the same container. The wax to sand or soil ratio can be from 1:200 to 1:2000 grams of wax to grams of sand or soil, depending on the thickness of the coating required. For common soils with smaller particles sizes and greater particle area per mass, 1:200 grams of wax per grams of soil or higher concentrations of wax can be used;

9. Next, the wax solution and the sand or soil are mixed in the container, for example by agitation (10 to 150 rpm, depending on the rotary evaporator characteristics); the bath of the container, for example the rotary evaporator, is maintained at 40° to 55° C. (T1). This process is under 1000 mbar of pressure (P1) and it takes 1 to 5 minutes (t1) in order to homogenize the wax solution with the sand or soil and to stabilize the temperature (See Table 1).

10. Then, depending on the solvent, the pressure is dropped to P2. This step can be done rather quickly over a time (t2).

11. Once the system is at P2, the rate of pressure drop is decreased at a constant rate, as can be seen in Table 1 over a time (t3), until it reaches the final pressure P3.

12. Once at P3, the system is maintained at the pressure P3 for a certain time (t4) and then the pressure is normalized to atmospheric pressure and the batch is finished.

Figure 3B:
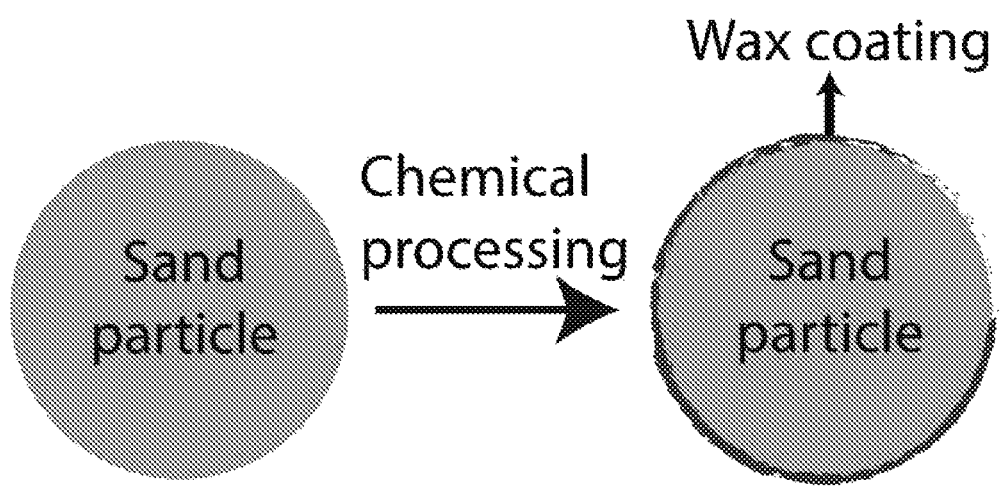
FIG. 3B illustrates a schematic for surface modification of sand or soil by treating it with a solution of wax dissolved in toluene, imparting hydrophobicity to the sand or soil. Subsequently, toluene is allowed to evaporate and condensed, leaving behind wax coated hydrophobic sand or soil.

This treatment leaves a thin coating of wax on the surface of each granule of sand or soil, rendering hydrophobic properties in the sand or soil to a ratio as low as 1 g of wax per 2000 g of sand or 1 g of wax per 200 grams of soil. However, it is preferred to use 1:600 grams of wax to grams of sand, which leads to t 20 nm thick films on the sand particles (FIG. 3B) or 1 g of wax to 50 grams of soil. Obviously, the thickness of wax coating can be tuned by increasing the wax to sand or soil ratio.

TABLE 1

Settings for evaporation of different solvents

| Solvent | Formula | Molecular weight | t1 - Time at P1 and T1 | t2 - Time from P1 to P2 (min.) | P2 - Pressure to boil (mbar) | t3 - Time from P2 to P3 (min.) | P3 - Final pressure (mbar) | t4 - Time at P3 (min.) |
|---|---|---|---|---|---|---|---|---|
| diethyl ether | $C_4H_{10}O$ | 74.12 | 1-5 | 0 | 1000 | 5-15 | 1000 | 1 |
| pentane | $C_5H_{12}$ | 72.15 | 1-5 | 0 | 1000 | 5-15 | 1000 | 1 |
| dichloromethane | $CH_2Cl_2$ | 84.93 | 1-5 | 0 | 1000 | 5-15 | 1000 | 1 |
| methyl t-butyl ether (MTBE) | $C_5H_{12}O$ | 88.15 | 1-5 | 0.5 | 700 | 5-15 | 500 | 1 |
| Petroleum ether (ligroine) | $C_{5-6}H_{12-14}$ | 72-86 | 1-5 | 0.5 | 900 | 10-25 | 160 | 5 |
| chloroform | $CHCl_3$ | 119.38 | 1-5 | 0.5 | 700 | 5-15 | 500 | 5 |
| tetrahydrofuran (THF) | $C_4H_8O$ | 72.106 | 1-5 | 1 | 500 | 5-15 | 300 | 5 |
| hexane | $C_6H_{14}$ | 86.18 | 1-5 | 1 | 360 | 5-15 | 160 | 5 |
| cyclohexane | $C_6H_{12}$ | 84.16 | 1-5 | 1 | 320 | 5-15 | 120 | 5 |
| triethyl amine | $C_6H_{15}N$ | 101.19 | 1-5 | 1.5 | 250 | 5-15 | 50 | 5 |
| toluene | $C_7H_8$ | 92.14 | 1-5 | 2 | 120 | 5-20 | 20 | 5 |

Materials:

The solvents and paraffin wax (molecular mass, $M_0 \approx 487$ Da, melting point T=65° C.) were purchased from Sigma Aldrich and used as is. In addition to paraffin wax, we tested beeswax, palm wax, and soy wax to find that all behaved similarly. Other researchers have investigated hydrophobization of sand, such as coating with (i) wax at 70-90° C.[6], (ii) polystyrene[15], (iii) silanes[7], and (iv) sprayable biodegradable polymers[16]. However, none of these methods have become mainstream so far due to cost of chemicals or chemical processing. As a result, for agricultural applications, polyethylene-based plastic mulches remain the most used mulches in the western world, despite their disposal-related ecological challenges.[17-18]

Figure 4A:
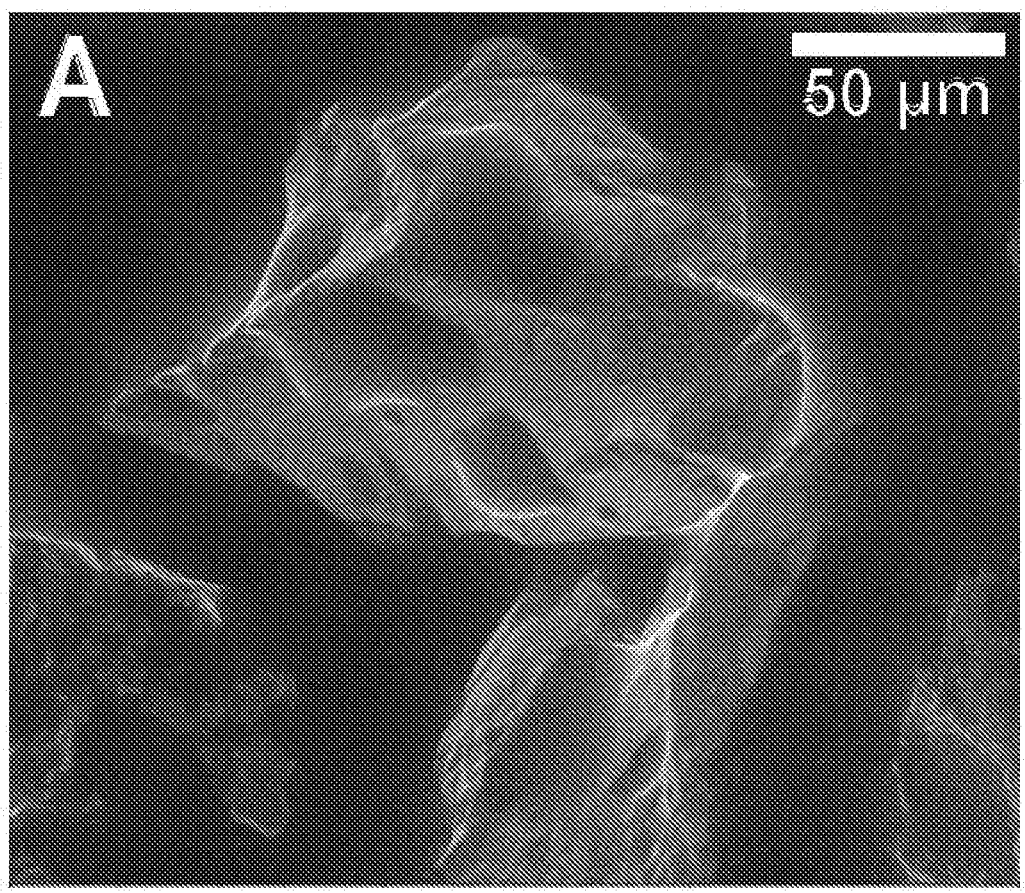
FIGS. 4A and 4B are environmental scanning electron micrographs of water on ordinary sand (FIG. 4A) vs superhydrophobic sand granules of the present disclosure (FIG. 4B). To condense water droplets in an electron microscope, partial pressure of water vapor is increased and temperature is dropped. (A) Water droplets on ordinary sand granules ($\theta_r\approx30°$) and (B) water droplets on a superhydrophobic sand granule, ($\theta_r\approx90°$). These images show that the contact angles are greater on wax-coated sand than on uncoated sand.
Figure 4B:
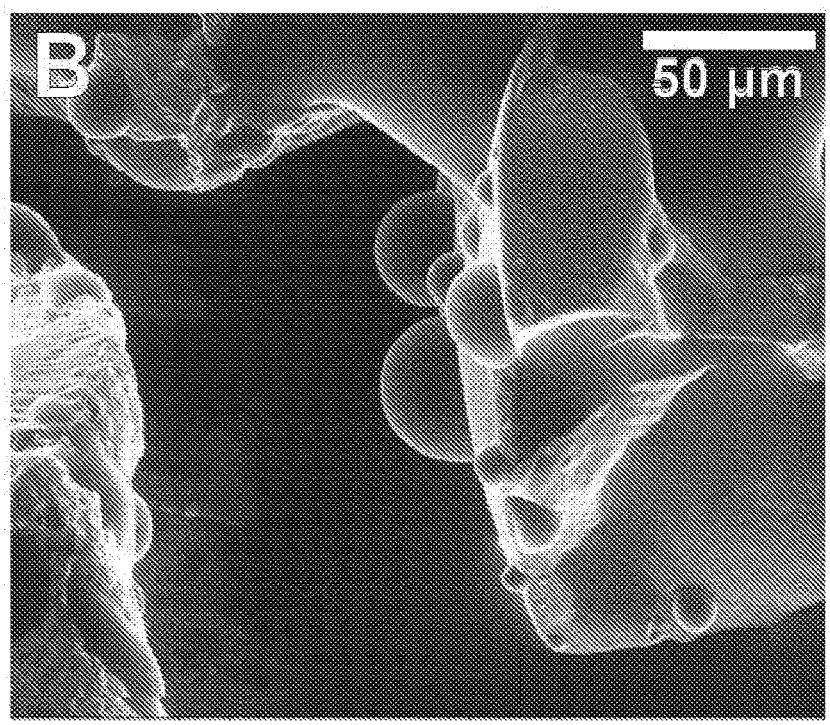
Figure 4C:
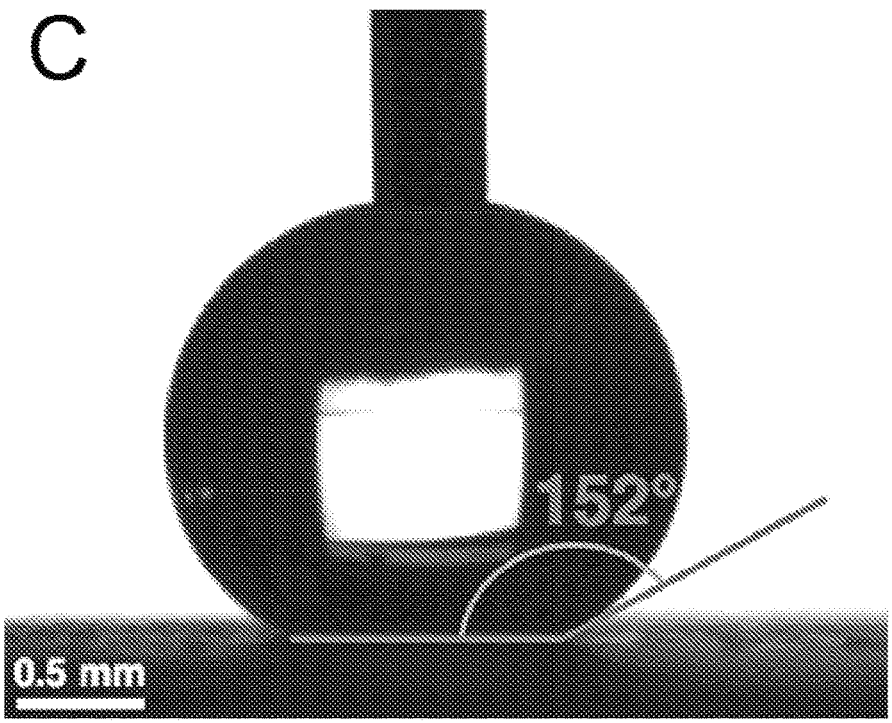
FIG. 4C depicts a sessile water droplet on a packed bed of hydrophobic sand. The roll-off angle was found to be, $\theta_{roll-off}\approx5°$. The apparent contact angle is $\theta_A\approx150°$ and this droplet can sit on top of the sand until its complete evaporation.

Characterization:

The wetting behavior of water on the present sand or soil was characterized rigorously. Contact angles of water microdroplets were measured on individual sand grains both before and after wax coating in an environmental scanning electron microscope (SEM). Whereas the contact angles were $\theta_0 \approx 30°$ for ordinary sand, they increased to $\theta_0 \approx 90°$ after hydrophobization. (FIGS. 4A-4C) When wetting of packed beds of the present sand or soil was measured with a contact angle cell for larger, millimeter scale, droplets of water, superhydrophobic behavior was observed: advancing and receding contact angles, $\theta_{Adv} \approx \theta_{Rec} \approx 150°$ (FIG. 4C) and as a consequence, if the solid surface was tilted water drops rolled off at $\theta_{roll-off} \approx 5°$. The difference between contact angles observed in the environmental SEM and apparent contact angles measured by a contact angle cell can be easily explained by the entrapment of air in the latter case, known as the Cassie-state.[19] If water drops (2 μL) were allowed to impinge on a packed bed of the superhydrophobic sand from a height of 2 cm it recoiled off the surface (due to preventive Laplace pressure explained above) to eventually land as a liquid marble decorated with sand particles (FIG. 1B).

Figure 5:
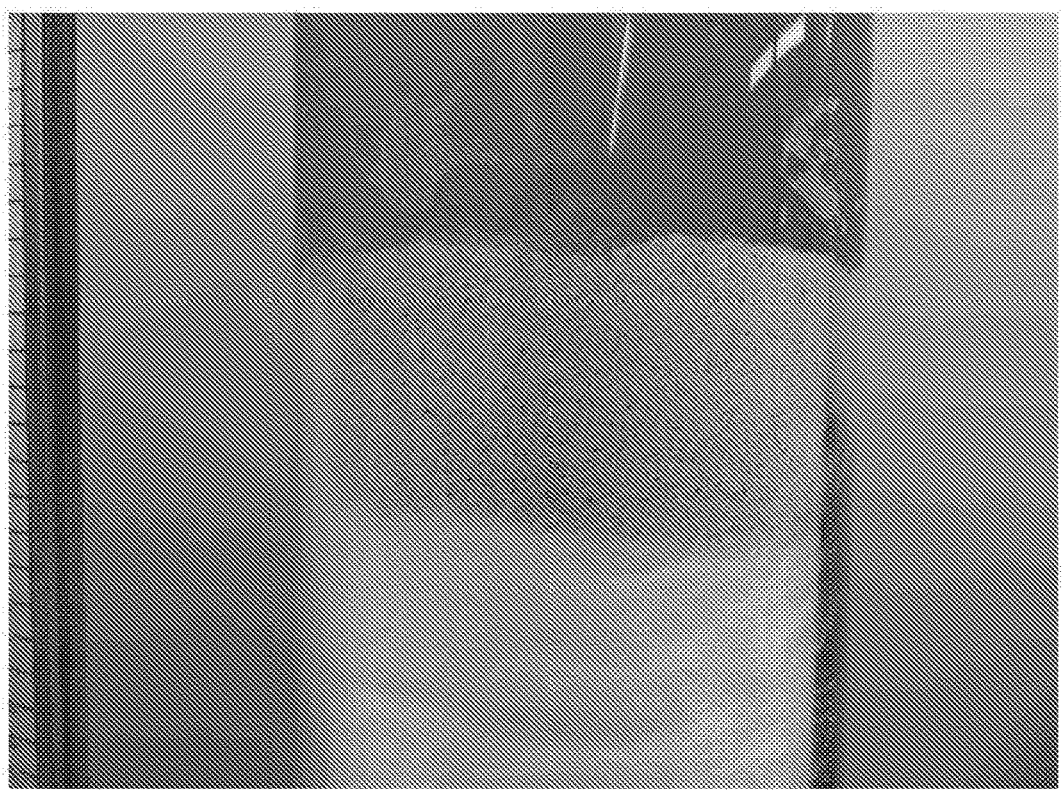
FIG. 5 is photograph of an embodiment of the present superhydrophobic sand holding a 60-cm column of water, with rhodamine dye. This experiment continued for over 1 week during which, water could not penetrate into the superhydrophobic sand.

Resistance of the superhydrophobic sands against penetration of water in a hydrophobized glass cylinder was also measured: a ~2-cm column of 300-μm-sieved superhydrophobic sand was placed over cotton and filled to the maximum a 60-cm column of water with rhodamine dye to aid visualization (FIG. 5). This experiment was observed for over a week during the course of which water did not penetrate.

Figure 6:
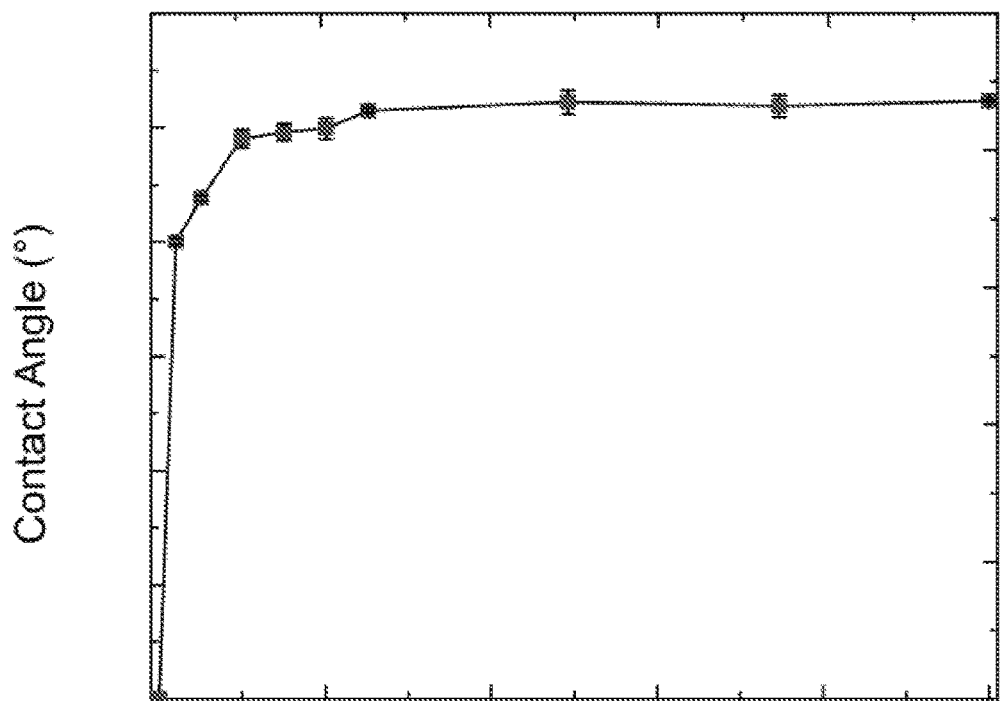
FIG. 6 illustrates the results of a mixed sand wetting experiment. Superhydrophobic sand according to embodiments of the present disclosure was mixed with normal (hydrophilic) sand at different fraction and the contact angle that a droplet made with a packed bed of the sand mixture was measured. This graph shows that even to a mixture down to 10% of hydrophobic sand, the superhydrophobicity can be seen. To fractions below 10%, the droplet was very unstable and would wet the sand bed under small disturbances.

Next, the ability of the present sand was tested to determine its hydrophobic properties when mixed with common (hydrophilic) sand (FIG. 6). It was observed that it was possible to place a droplet of water on the mixtures of superhydrophobic sand: common sand to ratios as low as 1:9. It is worth mentioning that this does not imply that the sand mixture is able to hold column of water as the pure 100% hydrophobic sand would. But this result is interesting, especially when compared with results obtained from U.S. Pat. No. 7,160,379[1]. Their method for coating was based on melting waxes and mixing with sand. Their method does not provide a uniform coating over the surface of the sand grains as evident from their data classified as follows: "good" when their hydrophobic sand prevents penetration of a droplet of water for at least 60 minutes. This "good" result is comparable to the result obtained herein when the present hydrophobic sand (10%) was mixed with normal sand (90%). This evidences that the present coating methodology is much superior to theirs. They only consider the hydrophobicity to be "excellent" when the sand bed is able to hold a water droplet for longer than 60 minutes, which is a very low standard for hydrophobicity. The processes that utilize the melted wax to coat sand either require much more wax than the present method(s) or they produce bad quality coating, which is the case for the cited patent U.S. Pat. No. 7,160, 379[1].

Notably, the present process for making sand or soil hydrophobic only uses 1 g of wax per 200 g of sand, preferably per 600 g of sand (good results were even obtained when 1 g of wax was used per 2000 g of sand). The process cited in U.S. Pat. No. 7,160,379[1] claims to use from 0.01 to 10% (Weight ratio of Wax blend to total coated sand Weight), processes as described herein were able to effectively use 0.050% (1 g of wax per 2000 g of sand) and truly make hydrophobic sand. Essentially, the present process uses much less wax for coating sands and is able to make a much more homogeneous coating, providing a more reliable process.

Example 2: Preventing Evaporation of Moisture from Pots

Figure 7A:
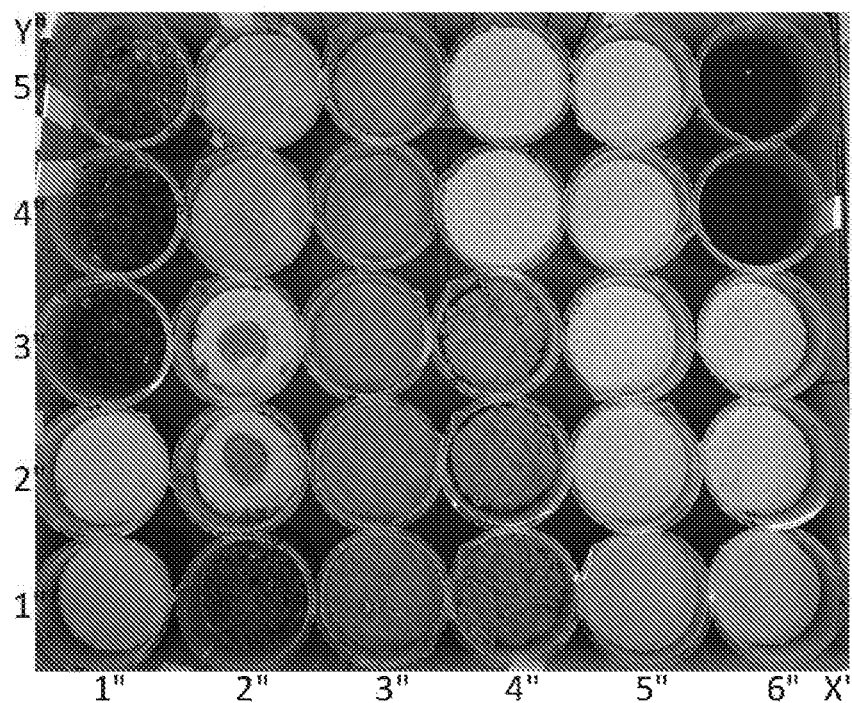
FIGS. 7A and 7B show results from an ambient-condition evaporation study performed at KAUST, Thuwal, Saudi Arabia.
Figure 7B:
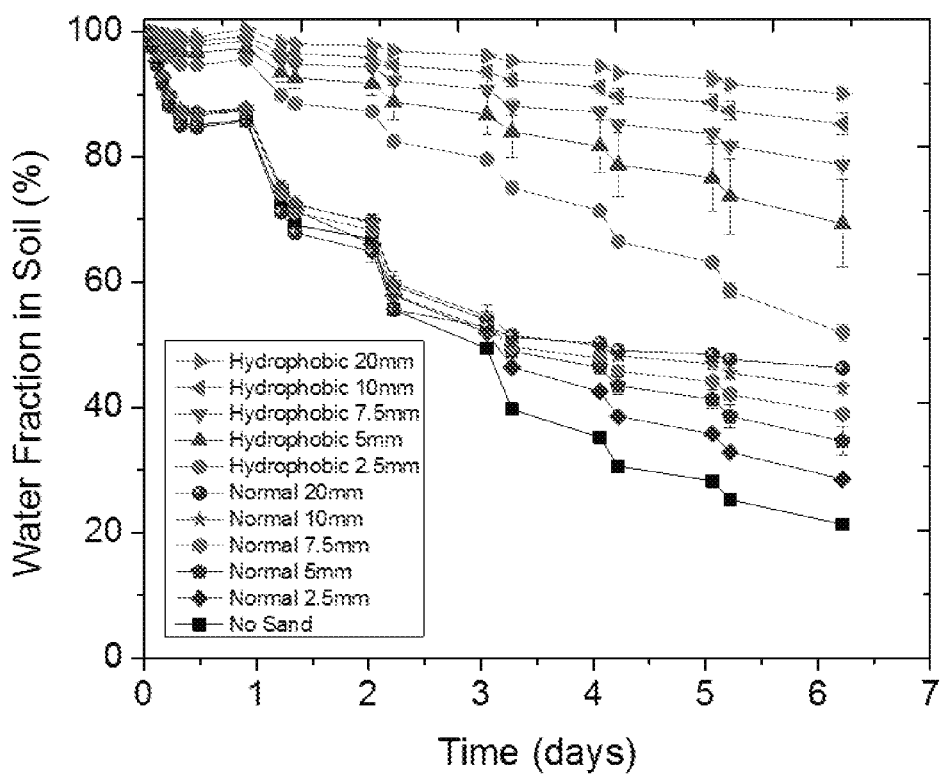

In order to measure the effectiveness of superhydrophobic sand or soil mulches on reducing evaporative losses in pots under ambient conditions, changes in the masses of pots containing soil (Metro Mix 360) covered with varying thicknesses of superhydrophobic sand were tracked over time (FIG. 7A). As shown in FIG. 7B, it was found that application of superhydrophobic sand can suppress evaporation of water from the top-soil significantly; in comparison, application of simple sand exhibited poor performance. From these data, 5 mm thick layers of superhydrophobic sands were exploited in our following experiments.

Figure 8:
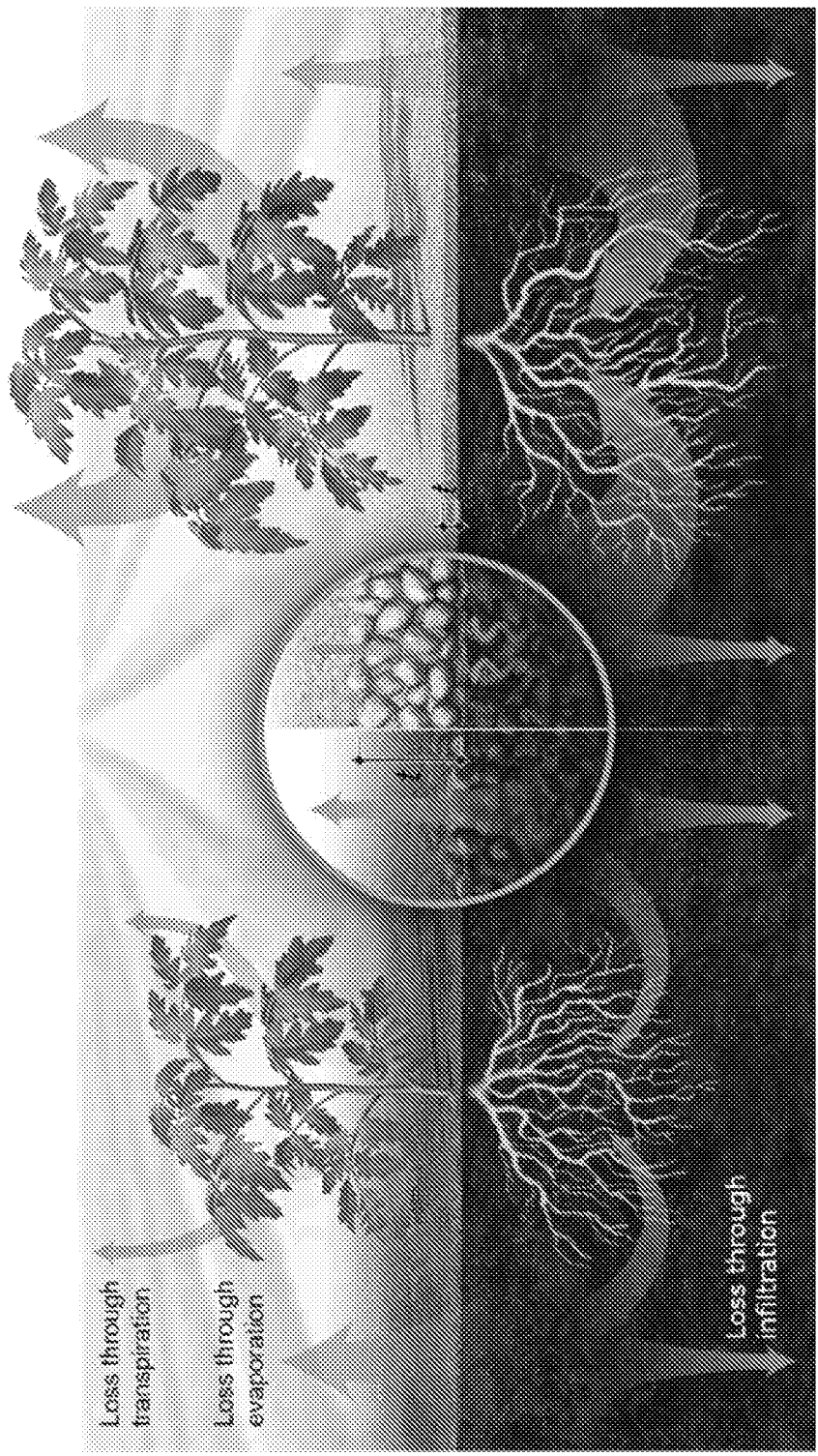
FIG. 8 is a graphic illustrating schematics of water loss from bare soil (left) compared to soil covered with the present superhydrophobic sand or soil (right). The evaporation loss is significantly reduced with the hydrophobic sand or soil cover. The infiltration loss can also be controlled with frequent and low volume irrigation. However, if this type of irrigation is applied in bare soil, the loss through evaporation will increase considerably. Overall, the hydrophobic sand or soil cover increases the amount of water available for plants to use for their metabolism and for transpiration.

To test the effectivenesss of reducing evaporative loss of water from pots, pot-scale experiments were conducted at the KAUST greenhouse. These experiments employed hydrophobic sand mulch as a top layer to reduce evaporation at the pot scale over a 7 weeks cycle for tomato and barley plants (as illustrated in FIG. 8). These experiments produced overwhelmingly positive results for tomato plants (Table 2 below). Due to higher retention of water in the soil covered with hydrophobic sand, the mass of shoots were 92% higher and roots 63% than control sample. Similar experiments were conducted for barley and mixed results were observed (Table 3).

The differences were attributed to plant physiology.

TABLE 2

Tomato results for pot-scale experiment performed in KAUST greenhouse

| Mass fraction of water in soil | Mean water loss every day (%): $\frac{M_{Added\ daily}}{M_{50\%}} \times 100$ | Breakdown of Total % water loss (Total % water loss = Mean water loss everyday (%)) | | Productivity | |
|---|---|---|---|---|---|
| | | % loss via evaporation | % loss via transpiration | Mass of shoots (g) | Mass of roots (g) |
| Normal irrigation (Control) | 15.4 | 78.0 | 22.0 | 16.46 | 2.6 |
| i. Normal irrigation + superhydrophobic sand | 17.3 | 34.8 | 65.2 | 31.58 (92% higher) | 4.23 (63% higher) |
| Drought condition (Control) | 18.0 | 66.6 | 33.3 | 12.96 | 2.2 |
| ii. Drought condition + superhydrophobic sand | 13.6 | 43.8 | 56.2 | 19.52 (50% higher) | 2.24 (2% higher) |

TABLE 3

Barley results for pot-scale experiment performed in KAUST greenhouse

| Mass fraction of water in soil | Mean water loss every day (%): $\frac{M_{Added\ daily}}{M_{50\%}} \times 100$ | Breakdown of Total % water loss (Total % water loss = Mean water loss everyday (%)) | | Productivity | |
|---|---|---|---|---|---|
| | | % loss via evaporation | % loss via transpiration | Mass of shoots (g) | Mass of roots (g) |
| Normal irrigation (Control) | 18.0 | 66.6 | 33.3 | 28.47 | 17.25 |
| i. Normal irrigation + superhydrophobic sand | 18.0 | 33.3 | 66.6 | 32.71 (15% higher) | 19.32 (12% higher) |
| Drought condition (Control) | 17.3 | 69.6 | 30.4 | 20.85 | 10.99 |
| ii. Drought condition + superhydrophobic sand | 11.0 | 54.5 | 45.5 | 15.32 (26% lower) | 10.21 (7% lower) |

Example 3: Preventing Evaporation from Soils in
Irrigated Agriculture

Figure 9:
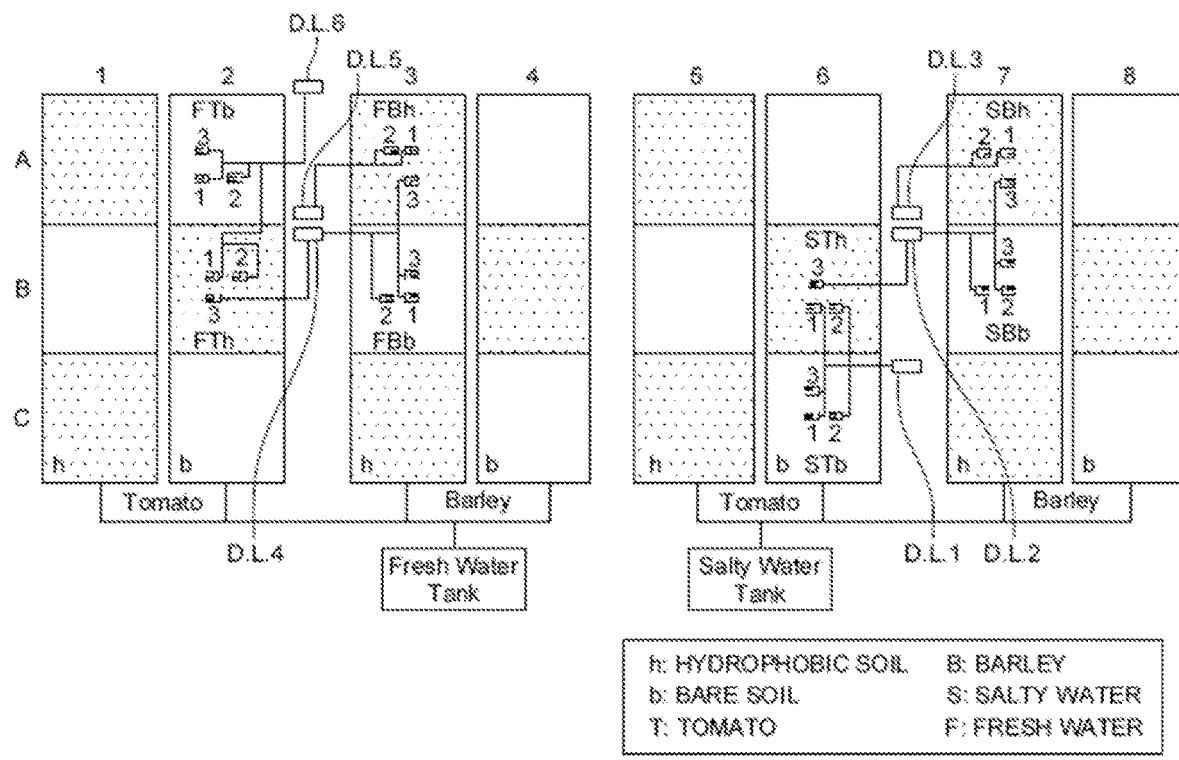
FIG. 9 shows field design for tomato and barley plants. The image shows the plot distribution (superhydrophobic sand versus bare soil) on the field, as well as the sensor locations.

Motivated by the experiments at the KAUST Greenhouse, field-scale experiments were conducted in western Saudi Arabia (Hada al sham, 21.799° N, 39.725° E) to test the impact of the hydrophobic sand mulch on the performance of two locally relevant crop species in desert agriculture settings under low and high salinity irrigation. Tomato (*Solanum lycopersicum* cv. Nunhems Tristar F1), a low planting density high-value horticultural dicot crop, and barley (*Hordeum vulgare* L. cv. Morex), a monocot crop grown at high densities typical for cereals, were chosen to gain insights into the applicability of superhydrophobic sands in different agronomical contexts. Additionally, the potential benefits of the hydrophobic sand or soils for crop performance under salinity stress were assessed, a prevalent source of abiotic stress in desert agriculture that often co-occurs with water deficit. As such, plots of tomato and barley grown with either (i) bare soil or a ~5 mm layer of hydrophobic sand, and (ii) low or high salinity irrigation, with endpoint phenotyping of various traits at harvest (example of set up shown in FIG. 9).

Figure 10A:
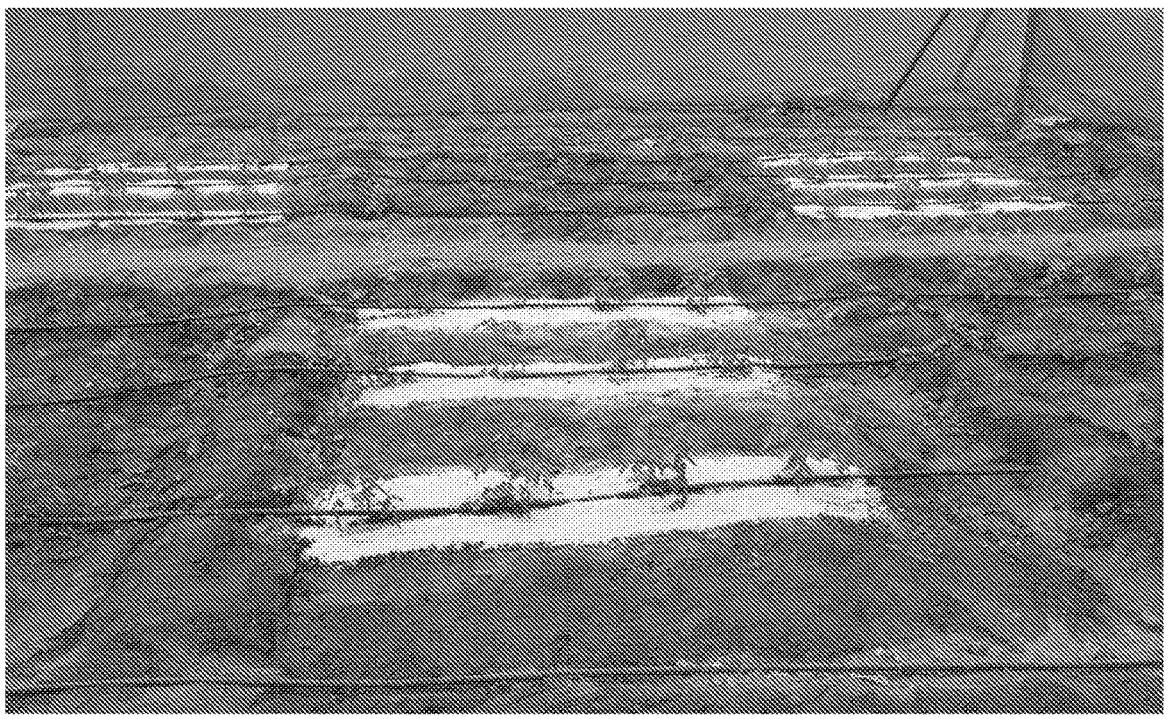
FIG. 10A is a photograph showing tomato plots. The image shows the plot distribution (hydrophobic sand layer versus bare soil) on the field for the fresh water study.
Figure 10B:
FIG. 10B shows barley plots. The image shows the barley plots under saline irrigation study.

Twenty-four sensors were employed directly under the plants to measure conductivity, temperature, and moisture content. In the tomato field, superhydrophobic sand was applied in 3 strips per plot, being 40 cm the width of the mulch line and the length extended 20 cm from the external plants in the plot lines (FIGS. 10A-10B). For the barley plots, the sand covered the entire area of the plot and extended 20 cm from the outer plants of the plot. The thickness of the sand layer in all plots was ~5 mm. Three dripping lines were installed in each of the tomato plots, along with six in the barley plots. The area directly under drippers was left uncovered with the superhydrophobic sand in other to allow for water infiltration. This system can be improved in future experiments, as the drippers can be buried to guarantee complete water infiltration.

Figure 11A:
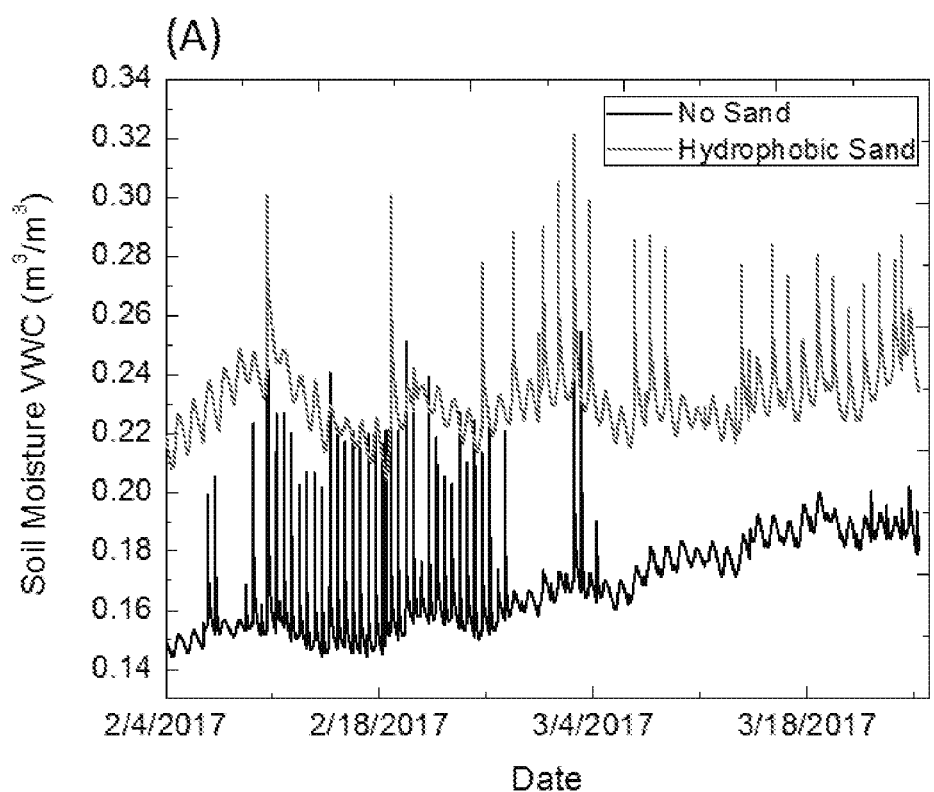
FIG. 11A depicts humidity sensor data from the tomato field experiments. Sensor data from the Hada Al sham field. This sensor data was from sensors 10 cm below the surface in fresh water conditions, and a data point was collected every 5 minutes. The data is for a two-month period.
Figure 11B:
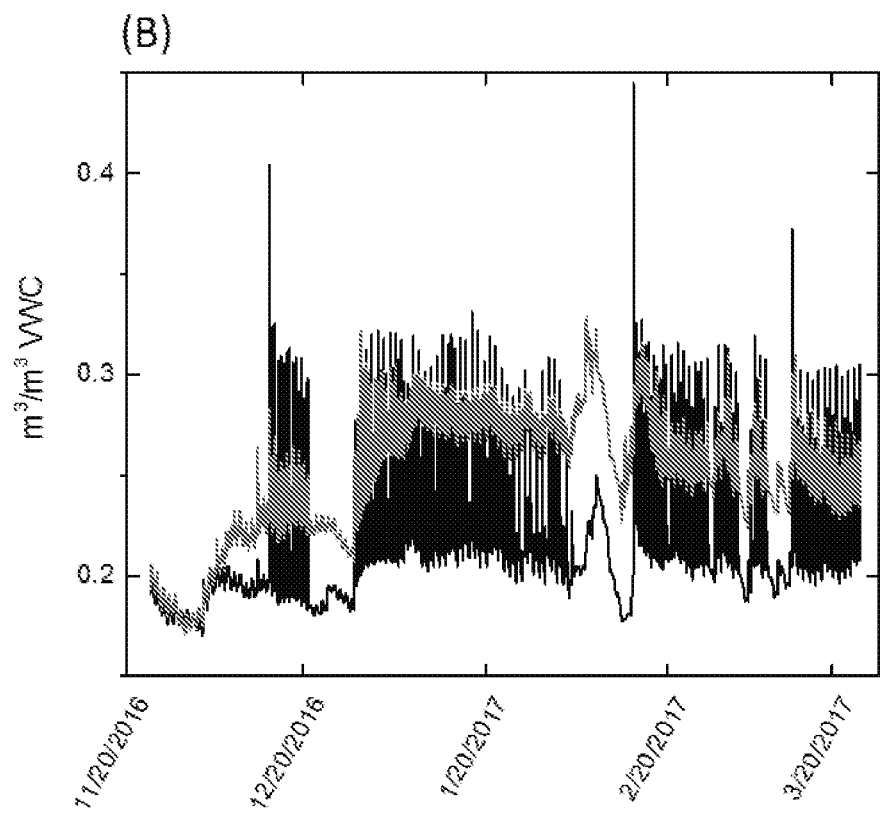
FIG. 11B depicts humidity sensor data from the barley field experiments. Sensor data from the Hada Al sham field. This sensor data was from sensors 10 cm below the surface in fresh water conditions, and a data point was collected every 5 minutes. The data is for a four-month period.

The sensors measured volumetric water content (VWC), defined as the ratio of the volume of water present in the soil to the volume of the soil[20]. As shown in FIGS. 11A-11B, it was found that VWC was significantly higher for both tomato and barley fields when a 5 mm thick layer of superhydrophobic sand was applied on the top-soil in comparison to bare top-soil (control case).

Figure 12A:
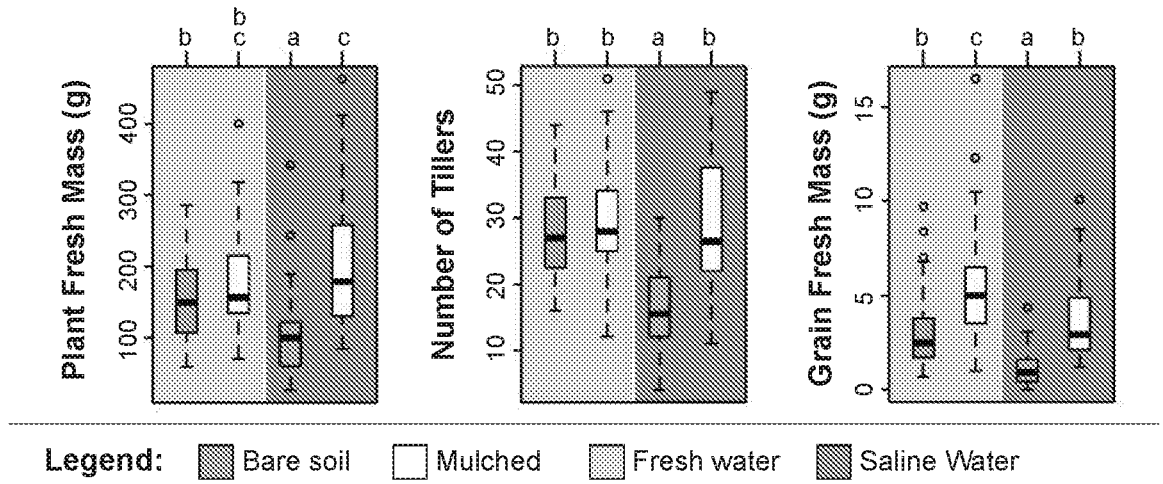
FIGS. 12A and 12B are boxplots of phenotypic data for field-grown barley (FIG. 12A) and tomato (FIG. 12B) plants under freshwater and saline irrigation (blue, left half, and orange, right half, background, respectively), with or without a superhydrophobic sand mulch layer on the soil surface (white and beige or darker boxplots, respectively). Each boxplot represents the distribution of measurements of different traits taken for individual plants from 3 replicate plots for each treatment group. Treatment groups were assigned letters based on a one-way ANOVA with post hoc Tukey's test ($p<0.05$), with different letters designating groups that are significantly different. FM, fresh mass.
Figure 12B:
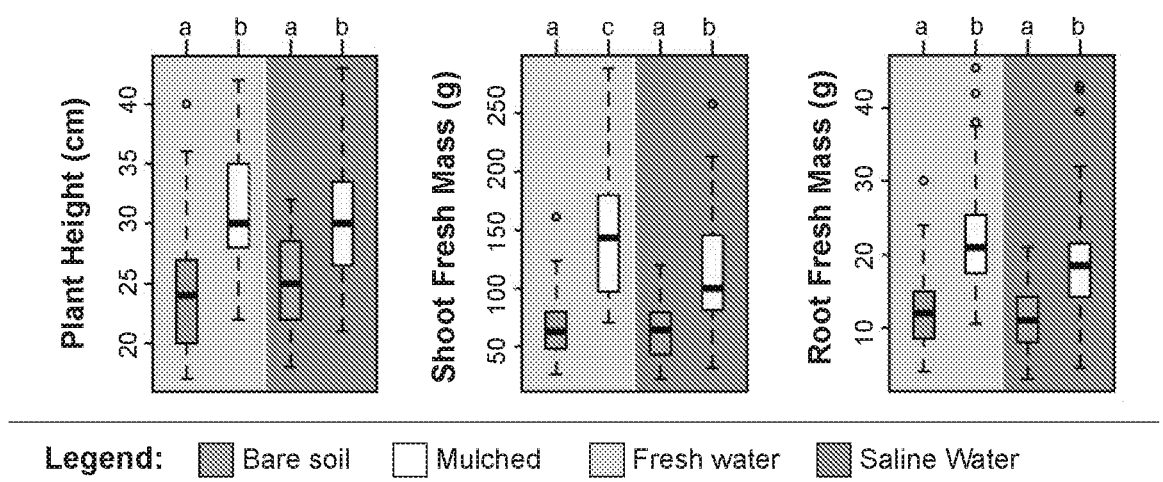

Mulched tomatoes exhibited significant improvements over unmulched in all traits under both low and high salinity irrigation (FIGS. 12A-12B). In contrast, under low salinity irrigation mulching in barley had a limited effect on most traits, with only grains FM increasing significantly in mulched barley plots. Interestingly, significantly enhanced performance was recorded for all traits under salt stress in mulched barley relative to unmulched. In line with the expectations, the hydrophobic sand mulch tended to benefit crop performance, ostensibly by raising soil moisture levels. Furthermore, mulching overwhelmingly improved performance under high salinity irrigation by attenuating salinity stress through the reduction of sodium concentrations in the soil—a dilution effect caused by the additional water. This is largely attributed to the disparities between the two crop species to contrasting planting densities. The greater spacing between tomato plants likely leads to higher levels of evaporation due to increased exposure of the soil surface to the elements, and thus more pronounced benefits from the protective qualities of the hydrophobic sand mulch under both low and high salinity irrigation. On the other hand, the tight canopy formed in high planting density barley plots may provide an adequate buffer to prevent excessive evaporation under control conditions. It is likely that the mulch still increases soil moisture, as indicated by enhanced performance under salt stress, but that this occurs beyond the threshold that is limiting for plant growth. Overall, these results show the hydrophobic sand mulch or layer significantly improved crop performance by increasing soil moisture levels. Furthermore, the results indicate that the hydrophobic sand mulch benefits particularly low planting density crops such as tomato. This suggests similar results could be obtained with other crops with similar agronomical practices, which tend to be high value horticultural species, such as peppers and aubergines. Furthermore, these results point towards effective applications of hydrophobic sand or soil mulches in cereal crops, whose agronomical practices preclude the use of conventional plastic mulches, for combatting salinity stress in particular.

Example 4: Liquid Marbles Made with
Superhydrophobic Sand

Figure 13:
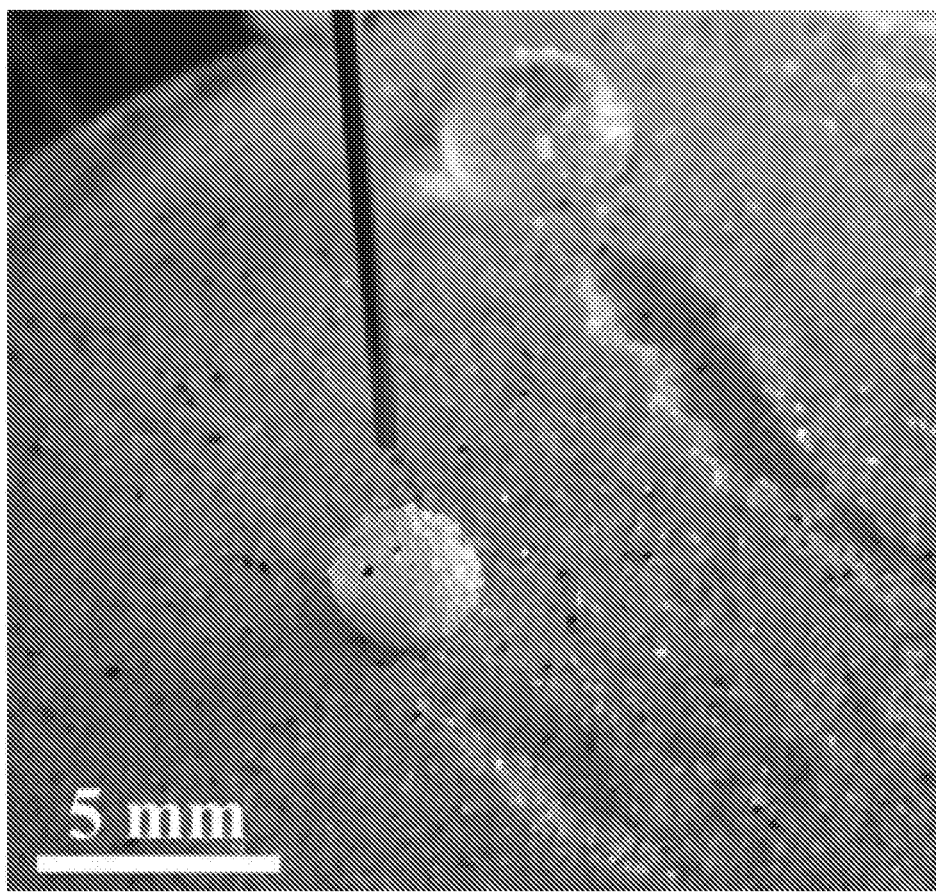
FIG. 13 is a picture of liquid marbles. The photograph of two liquid marbles was made by rolling a droplet of water on top of an embodiment of the present hydrophobic sand. The formation of the liquid marbles can be observed when the hydrophobic sand particles adhere to the surface of the water droplet making a (roughly) monolayer of particles.

Against common expectation, granular hydrophobic media can encapsulate water droplets and the resulting material is known as Liquid marbles (FIG. 13)[21-22]. Here, we report on the nature of liquid marbles obtained by trapping water drops inside a monolayer of hydrophobic sand particles by rolling a water droplet, on to a bed of sand (FIG. 13).

Figure 14:
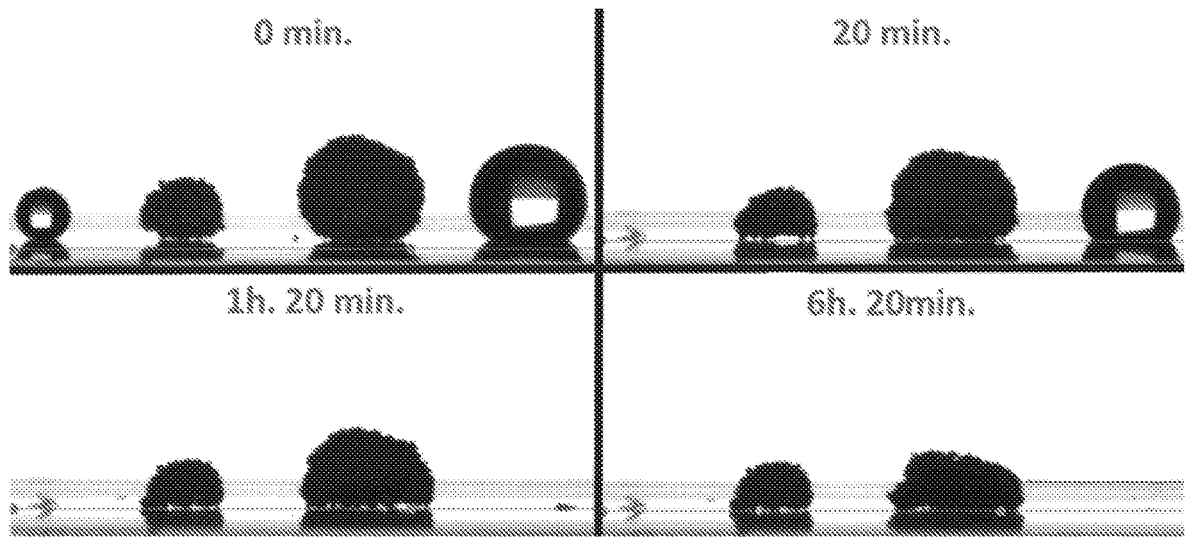
FIG. 14 shows photographs from the liquid marbles evaporation experiment. A visual comparison of evaporation rates of water droplets against liquid marbles. On the left droplet and marble with initial volume of 10 μL and on the right, marble and droplet with initial volume of 80 μL at two different time points.
Figure 15:
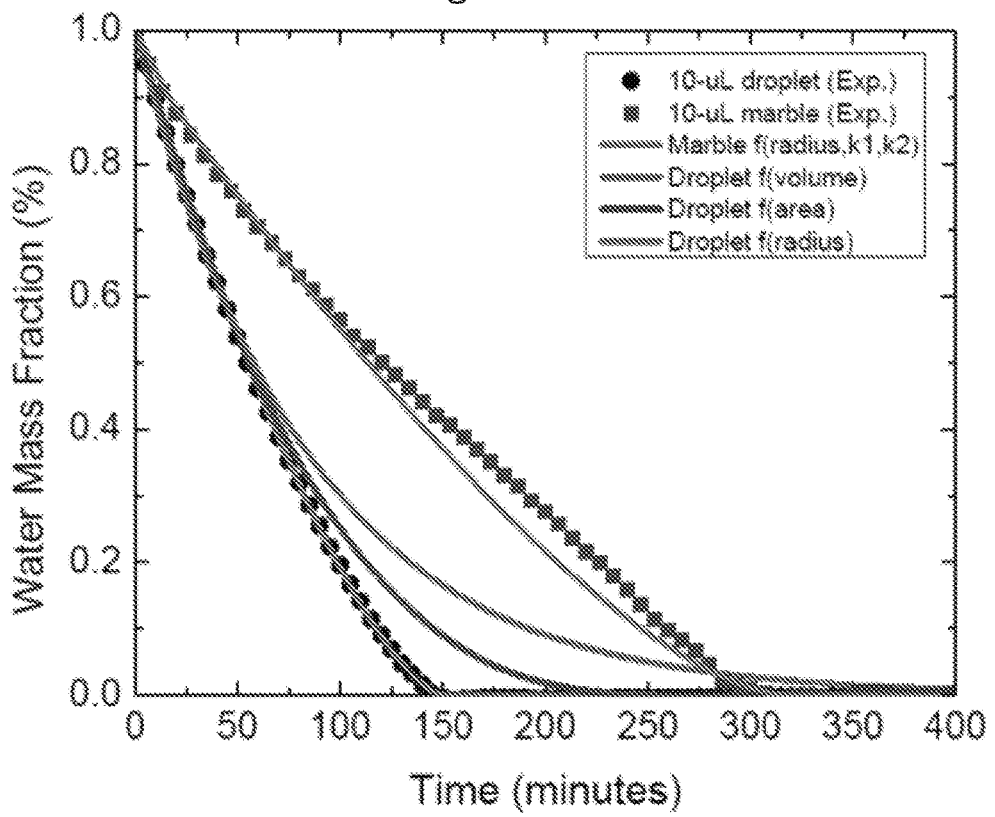
FIG. 15 visualizes data from the liquid marbles evaporation experiment. This experiment shows the properties of the liquid (water) marbles made with an embodiment of hydrophobic sand as described herein in reducing the evaporation rates when compared with water droplets.

Interestingly, liquid marbles formed by capturing 10-µL droplets deionized water in our superhydrophobic sand demonstrated a 50% slower rate of evaporation under ambient conditions (T=294 K, P=1 atm, 60% relative humidity) (FIG. 14 and FIG. 15).

Equation 1 shows the evaporation model used, where D is the diffusion constant and k is the resistance for evaporation, set to 1 in the case of droplets and it assumes a value higher than 1 for marbles. Evaporation rates were modeled as a function of radius (r), surface area, and volume of the droplets (FIG. 15).

$$\frac{dm}{dt} = -\frac{D}{k} \cdot r \cdot (P_{sat} - P) \qquad \text{Eq. 1}$$

The ability to hold water for longer times than common water droplets can unlock potential applications as microbial reactors. Water drops trapped inside liquid marbles do not readily coalesce when pressed against each other. Thus, by capturing water in liquid marbles, advantage can be taken of large surface area to uptake gases at the liquid interface that microbes could metabolize.

Example 5: Superhydrophobic Sand or Soils for
Reducing Dust Acumulation

Figure 16A:
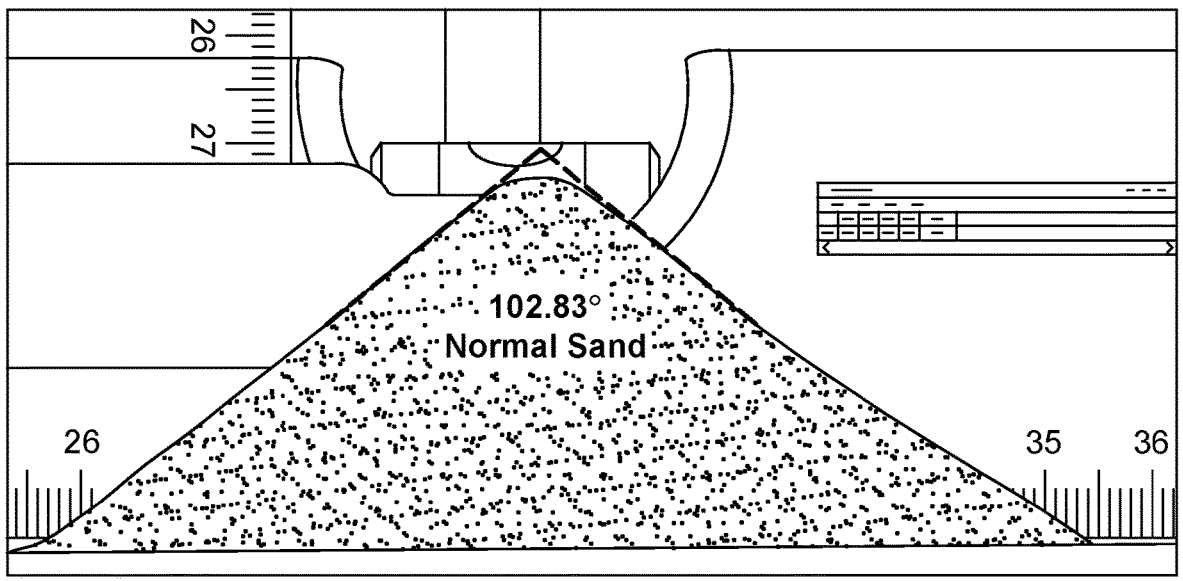
FIGS. 16A-16B are photographs showing cone angle of normal (FIG. 16A) versus superhydrophobic sand (FIG. 16B). The wax coating increases the coefficient of friction (tangent of half, of 180 degrees minus the cone angle). So, the lower the cone angle, the greater the coefficient of friction between the sand particles.
Figure 16B:
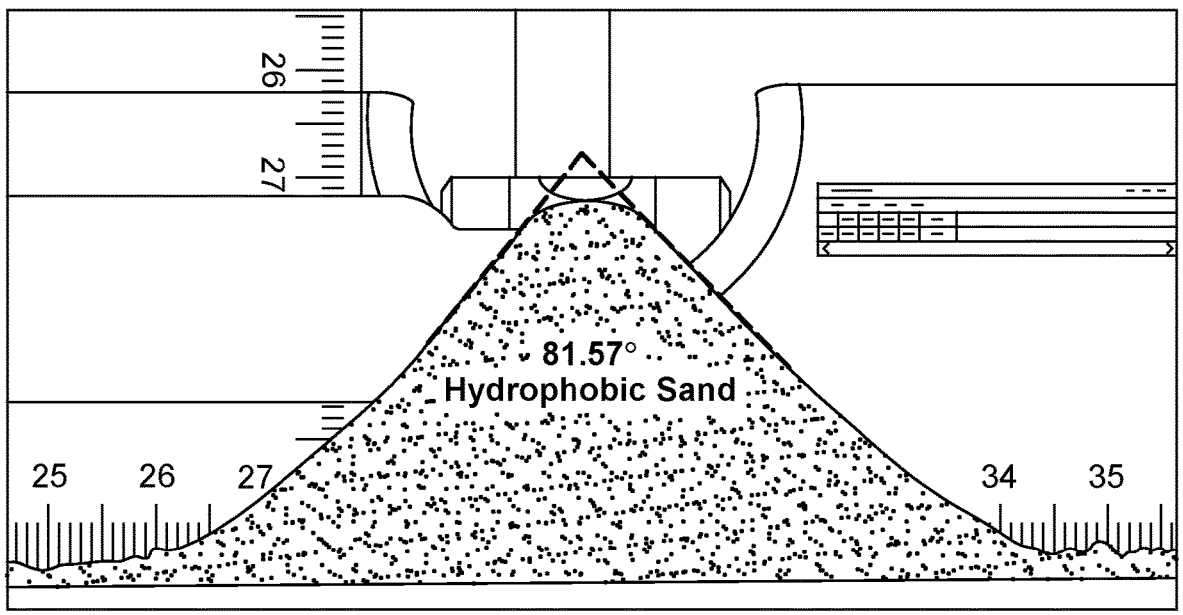
Figure 17A:
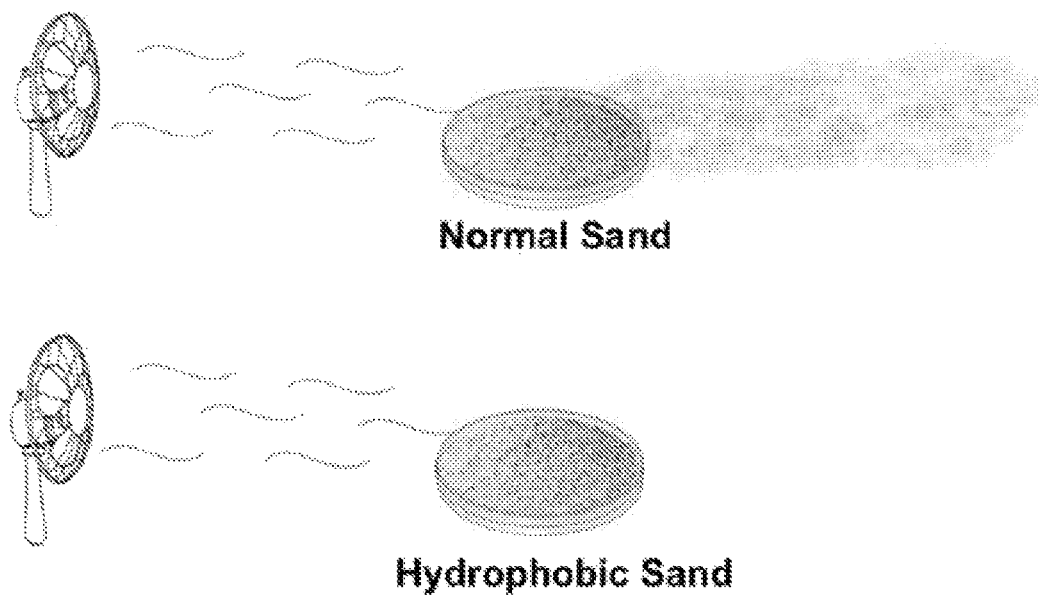
FIGS. 17A and 17B illustrate a dust lifting experiment and data therefrom.
Figure 17B:
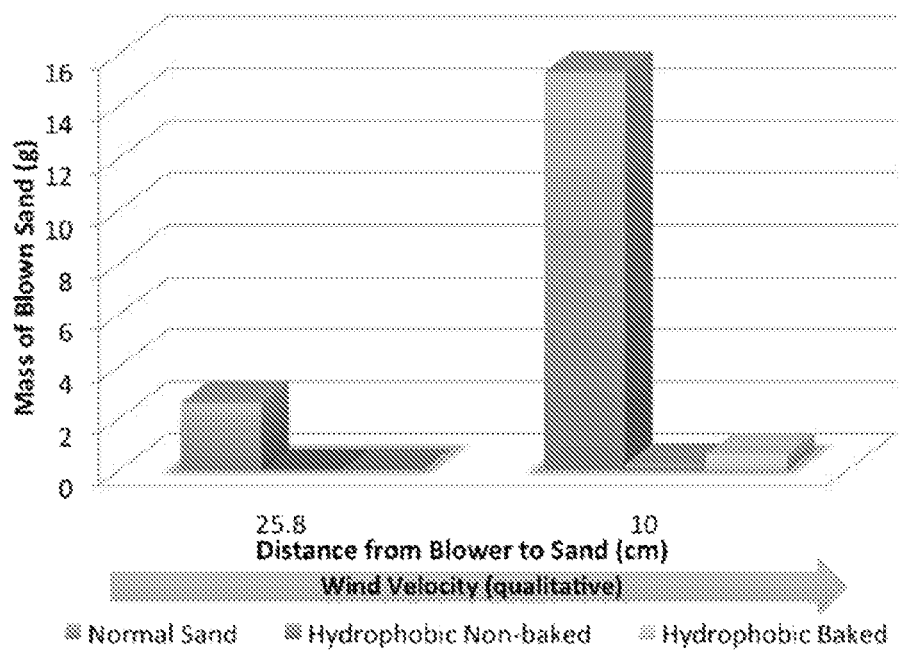

The wax coating in our superhydrophobic sands increases the coefficient of friction (tangent of half, of 180 degrees minus the cone angle) (FIGS. 16A and 16B) between the grains, making it more difficult for wind to move the bigger particles and lift the smaller ones (FIGS. 17A and 17B).

Thus, the present superhydrophobic sand or soil can be used to cover areas around solar farms or cities in desert lands in order to reduce the dust lifting from those areas and thus, reduce the dust accumulation on solar panels, houses, or other objects.

Example 6: Superhydrophobic Sand or Soil for Corrosion Prevention, Thermal Insulation and Easier Maintenance of Underground Pipes/Cables/Electronic Devices/Other Objects The present superhydrophobic sand or soil can also be used in construction to fill ditches/trenches/cavities that have cables, pipelines or other corrosion-prone objects buried. By using the superhydrophobic sand or soil instead of common soils or other hydrophilic materials, moisture in the common soil would not infiltrate towards those objects. This insulation would reduce corrosion problem in metallic objects, such as pipelines and electrical equipment. It would also prevent soil compaction around those objects, facilitating future maintenance/excavation of the objects buried (cables or pipeline for instance). The dry superhydrophobic sand or soil filling around those buried objects would also act as a cheap thermal insulator, thus, reducing the thermal losses or gains in fluid pipelines.

Example 7: Superhydrophobic Sand for Rooftop Thermal and Humidity Insulation The superhydrophobic sand can be used to cover roofs of houses or other types of buildings. This sand layer would act as a thermal insulator. The big advantage here is that rain would not accumulate on the roofs, decreasing the possibility of mold growth or infiltration.

Example 8: Superhydrophobic Sand or Soil for Insulation of Foundations of Buildings Against Soil Moisture Superhydrophobic sand or soil can be used to insulate underground foundation from humid soils, which would reduce water infiltration, growth of mold, percolation of salt, and provide thermal insulation

Example 9: Superhydrophobic Sand or Soil for Waterproof Pavement Bases

The superhydrophobic sand or soil can be used as a waterproof base layer for the construction of pavements that suffer from soil moisture uptake. Changes in the moisture content make soils expand or contract accordingly, causing structural problem with pavements. By applying a layer of hydrophobic sand or soil between the humid soil and the pavement, the impact of soil activity can be reduced.

Example 10: Superhydrophobic Sand or Soil for Making Freeze-Proof Soils

Since water expands during freezing, changing from liquid to solid state, formation of ice could cause severe structural damages to walls, pipes, or other objects. By preventing infiltration of water, superhydrophobic sand or soil would prevent formation of ice in ground. Thus, the present superhydrophobic sand or soil can also be used as a freezing-proof insulating layer around a variety of objects.

Example 11: Superhydrophobic Sand or Soil for Preventing Water Percolation

Superhydrophobic sand or soil can be used as an underground layer (several centimeters thick) to prevent water percolation in agricultural land (to reduce the needs of irrigation), sewage canals or landfill areas (to prevent percolation of contaminated waters down to the underground water table), irrigation canals (to prevent water loss through percolation), or even as a safety barrier to prevent infiltration of contaminated liquids (the sand or soil can be tested for each liquid) spread as a thick layer on the ground around tanks (containing hazardous liquids) with risk of leakage.

Example 12: Superhydrophobic Sand or Soil for Membrane Distillation

Membrane distillation is a method to desalinate water wherein two streams of water are separated across a superhydrophobic membrane. As illustrated in FIG. 3A, liquid water cannot pass through this membrane. Typically, a hot feed solution (e.g. seawater at 70° C.) is on one side of the membrane and a cold stream (e.g. 20° C.) on the other. Due to their superhydrophobicity, the material can be suitable for this application.

Membrane Distillation (MD) is a promising low-energy technique commercially employed that can be used for applications such as water desalination or removal of other impurities. It can use waste heat, e.g. from industry, to heat up the feed water (which can be salty) to ~50-70° C., and a hydrophobic membrane with small pore sizes that only allow water vapor to pass through. Water vapor can then be condensed on the other side (FIGS. 18A and 18B)).

Figure 18A:
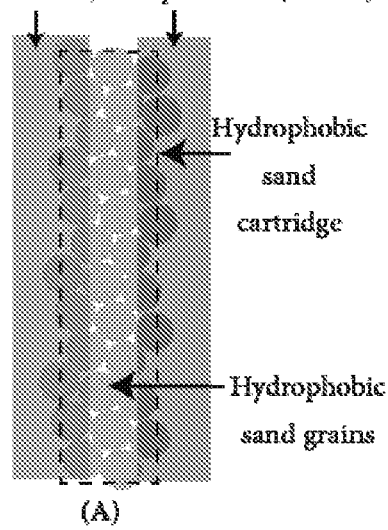
FIG. 18A is a schematic of membrane distillation using an embodiment of a wax-coated hydrophobic sand according to the present disclosure.
Figure 18B:
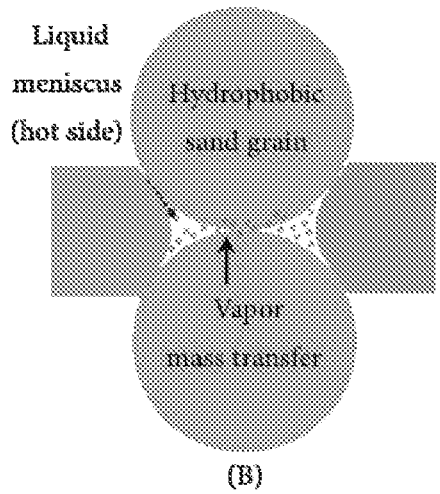
FIG. 18B is a schematic of the vapor flow from a warmer salty water to a cooler desalinized region.

The use of wax-coated sand or soil as described herein as the superhydrophobic membrane is shown in FIG. 18A. Use of wax-coated sand or soil as a membrane involves placing the hydrophobic sand or soil in a flexible net or container (with pore size smaller that sand or soil) to secure it. The superhydrophobicity of wax-coated sand or soil and the small sizes of coated sand grains or soil particle scan generate high Laplace pressure (explained in FIGS. 2 and 3A above) which can prevent liquid water from the feed from traveling to the permeate side or vice versa. One skilled in the art would recognize in membrane distillation the membrane must withstand the pressure applied on the feed waterside. Thus, the higher the Laplace pressure, the higher will be its tolerance. Thus, only water vapor will pass through (FIG. 18B). An advantage of using hydrophobic sand or soil is that it can be inexpensive compared to other methods. Further, it may provide flexibility to choose pore sizes to tune flux. Milling coated sand or soil and ball-milled to finer (nanoscale) sizes is an example of how particles may be tuned to alter flux.

A membrane distillation process as described herein typically applies a pressure (2-4 bar) and temperature (50-90° C.) on the feed water (i.e. salty water) side of the membrane. Thus, while liquid water cannot pass through a cartridge/membrane made of wax-coated sand or soil due to capillarity, water vapor can due to the pressure and/or temperature difference across the membrane. Further, this process utilizes thin membranes to minimize losses in the transport of vapor flux. (On the other hand, to reduce evaporation in agriculture, thicker wax-coated sand or soil layers can be more effective.)

Figure 19:
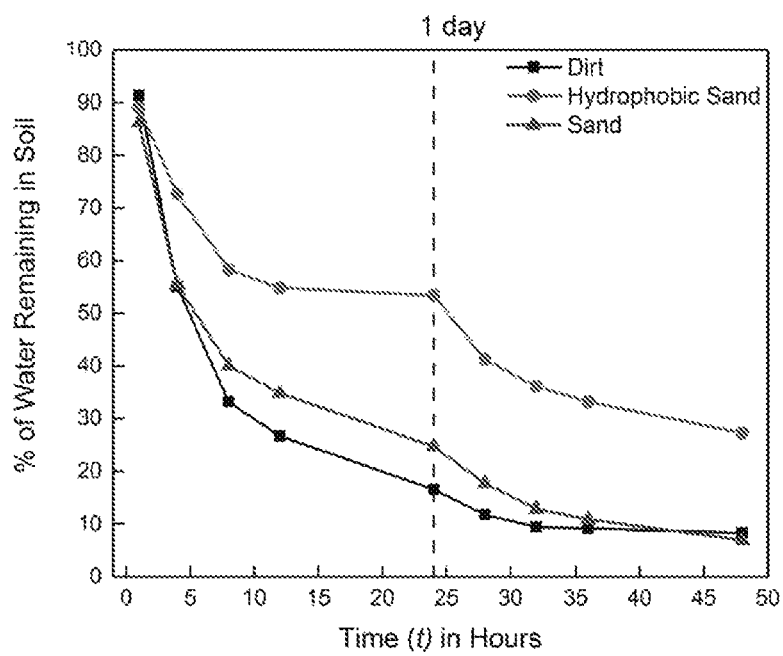
FIG. 19 depicts a 48-hour long study comparing losses of water through ordinary farm soil (squares), ordinary farm soil covered with a 2-3 mm thick ordinary sand layer (triangles), and ordinary farm soil covered with a 2-3 mm thick hydrophobic sand layer (circles).

Example 13: Inhibition of Evaporative Water Loss from Ordinary Soil when Covered by a Hydrophobic Sand Layer Under Desert-Like Conditions To quantify the effect of a top-layer of hydrophobic sand or soil on reducing evaporative loss of water throught ordinary agriculture soil (3 cm thick), pot-scale experiments were conducted employing standard mass balance (accuracy 0.01 µm) over a period of 2 days (Average temperature: 24.7° C., Relative Humidity: 70.5%). A 2-3 mm thick layer of hydrophobic sand on ordinary soil was observed to reduce evaporative loss of water by 48% over a 24 hour period (FIG. 19). This result shows that employing hydrophobic sand as a cover for agricultural soil can dramatically reduce water losses via evaporation. In turn, this can result in a significant reduction in the consumption of irrigation water and automatically reduce the perils of sodication (i.e. deposition of high concentrations of salts) in the top soil over time due to irrigation with partially salty water, as is the case in arid regions near large sources of salt water.

Field scale testing of hydrophobic sand towards reducing irrigation needs is a consideration for validating potential uses of hydrophobic sand or soil. For example, parts of fields can be covered with hydrophobic sands or soils to facilitate focused irrigation (FIG. 20) near seeds during tilling (because water will not wet hydrophobic areas and will be driven to hydrophilic soil right above the seeds). Another key advantage from covering agricultural soils with hydrophobic sand or soil is that the farm soil can retain higher water content than without hydrophobic sand or soil. This can ensure that crops/plants undergo lower water stress on a regular basis (daily), and can lead to improved crop yields. Further effects of degradation of wax by soil-borne bacteria and any unexpected deleterious effects of hydrophobic sand or soils, such as leaching of residual solvents, can also be tested to ensure long-term safety relating to the use of hydrophobic sand or soils in agriculture.

Figure 20:
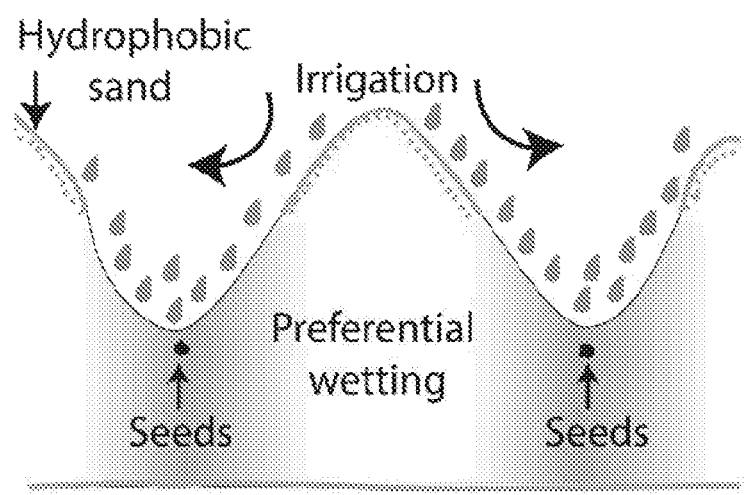
FIG. 20 illustrates a schematic of a hydrophobic sand layer acting as a mulch layer on a freshly tilled field with regularly spaced seeds.

The superhydrophobic behavior of the functionalized sand or soil as described herein repels liquid water (FIGS. 1A and 1B). One skilled in the art would recognize that in the presence of the functionalized sand or soil, such as a wax-coated sand or soil layer, liquid water inside the soil cannot climb up all the way up to the soil-air interface, via capillarity, and evaporate directly due to solar radiation for example depicted as in FIG. 3(*a*) and as compared to FIG. 2. Instead, the temperature of the whole soil surface has to rise significantly to evaporate water in the soil before it can escape via molecular diffusion (which depends on ambient, temperature and relative humidity). Hence, a decrease in loss of moisture content in soil is seen when a layer of wax-coated sand is placed on top (FIG. 20). This decrease will be higher for thicker functionalized, for example wax-coated, sand layers.

Example 14: Market and Cost Analysis

Already, there are some teams/companies selling hydrophobic sands for desert agriculture, but their acceptance has been limited due to cost and ease of usage. For example, Desalt Innovation Middle East (DIME), UAE, is selling product which if used in 5-10 cm thick layers can provide a hydrophobic barrier using a proprietary German technology that we suspect the process to involve functionalization via organosilanes.[7] Note that 5 mm thick layers will necessitate 67,000 kg of hydrophobic sand (giving the mass density of 1.5 g/cc) to cover 1 hectare (10,000 m$^2$). There are other reports 90 g of wax was employed to modify 1 kg of sand.

A strategy can be to employ the cheapest raw materials along with straightforward processing and reuse of reagents. Thus, paraffin wax, a by-product of the petroleum industry, can be chosen as the additive and developed a process to recycle the solvent employed to dissolve it. Presented below is a model calculation for cost estimation.

1 kg of paraffin wax can be employed for 600 kg of beach sand, for example, and a suitable organic solvent to dissolve wax. Thus, the cost of hydrophobic sand can be simply offset by a month of water usage. It can then be estimated that the cost of manufacturing the present superhydrophobic sand, including materials (sand, wax, solvent), and the energy requirements would be around USD $8/ton in 2017, and by adding the costs for spreading a 5 mm layer on agricultural land, the cost can be estimated to be around USD $8/ton or USD $620 per full hectare in 2017. Also, taking into account that usually, the area covered by the sand mulch is only around 2 cm to each side of the plants, this would reduce the area in which the mulch would be applied to about 40% of the total agricultural land. Thus, the cost of the hydrophobic sand mulch is reduced to USD $250 per hectare in 2017.

Considering that high-value crops can grown in deserts, such as tomatoes, flowers (perennials), strawberries, and dates will definitely benefit from this innovation because they can yield higher profits for a given agricultural area, easily offsetting the costs of the hydrophobic sand mulch. It is expected that the wax coating layer to last for at least one year in field conditions. In comparison, the DIME Hydrophobic Materials gives a 30 years guarantee. A key advantage of our wax coating is that it is biodegradable[23] and it will not keep the sand or soil hydrophobic for longer than the period for total wax degradation. Field tests demonstrated that the present superhydrophobic sand or soil maintained its wetting behavior in harsh climate for at least 6 months. The pot-scale experiments have confirmed ability to last over a year.

An exemplary life cycle of the hydrophobic sand or soil mulch can include: (1) start with common sand or soil and wax, (2) manufacture the hydrophobic sand or soil with the methodology described herein, (3) place a layer of hydrophobic sand on topsoil to use as a barrier for water evaporation (mulch), (4) grow higher quality crops with lesser water and fertilizers, reapply the hydrophobic sand or soil mulch in the areas that are damaged due to soil tilting after each crop cycle or once the hydrophobic coating has been degraded.

Due to their inert nature, compositions of hydrophobic sand or soil as described herein can last for years, further supporting the inexpensive nature of these compositions and methods as replacement of sand may not be frequently needed. Yet, over time, the material is biodegradable and will not contaminate the soil.

Example 15: Prevention of Storms in Deserts

Dust storms are formed when winds can 'lift' small particles of dust (sand) into the atmosphere. They cause various large-scale challenges in the MENA region, for example, respiratory illness, poor visibility for road- and air-traffic, dust accumulation and subsequent abrasion in machinery, and dust accumulation on solar panels leading to lower efficiency. Wax-coated sand or soil can be a cost-effective technology to prevent the formation of dust or sand storms, if specific locations where regional winds lift maximum amount of dust or sand are known; identifying locations particularly susceptible to large amounts of dust being lifted by regional winds can be done via satellite imaging, for example. Coating sand or soil particles with a hydrophobic substance alters surface properties of the sand or soil. Increasing the coefficient of friction between wax-coated sand particles is an example of such. Altered surface properties, such as a higher coefficient of friction, can reduce/arrest their movements under a shear flow of fluid, such as a flow of air or a flow of water. Effects of raising the coefficient of friction between particles of sand by coating with a hydrophobic substance, such as wax, can be seen as validated by the experiments described below.

Coefficient of friction: In two separate experiments, approximately 90 grams of ordinary and wax-coated sand were dropped via a 2 mm wide glass orifice on a flat and smooth stainless steel surface from a height of 5 cm. The resulting shapes of the pyramids composed of sand grains were compared (FIGS. 16A and 16B). It was found that the angle at the top vertex of the pyramid decreased from ordinary (102.83°) to wax-coated sand (81.57°). This simple experiment demonstrates that the wax-coated sand can have a higher average coefficient of friction than the ordinary, non-coated, sand.

Sand transfer in simulated wind: A simple device such as a blow dryer can be used to simulate a shear flow of air or wind. A blow dryer can be turned on and applied to a mass of sands, non-coated and coated, and mass transfers following exposure to a shear flow of air can be compared for the two sand samples. Approximately 80 g of non-coated, "normal", sand was put on a petri dish, and 80 g of coated sand was put on a second petri dish, and the two samples were exposed to lateral airflow. A schematic is shown in (FIG. 17A). Sand samples can be exposed to lateral air flow as-is, or after baking at 50° C. for 24 hours (to simulate the heat of the sun). It was found that the mass transfer for the case of wax-coated sand, as-is and after baking at 50° C. for 24 hours, was dramatically lower, as shown in FIG. 17B. Since the wax coating is at the nanoscale, the effect can be due to the enhanced density of wax-coated sand, but due to its higher coefficient of friction, as demonstrated above. Further, wax-coated sand can also be expected to form a percolation network under the intense heat of the sun, which might further decrease the mass transfer.

Example 16: Superhydrophobic Sand or Soil Mulches to Reduce Evaporative Losses and Enhance Productivity in Desert See Attachment A, the entire contents of which are incorporated herein by reference.

Example 17: Controlling Evaporation Rates of Water Droplets Trapped as Liquid Marbles in Superhydrophobic Sands or Soils See Attachment B, the entire contents of which are incorporated herein by reference.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

REFERENCES

1. Shoshany, H.; Shoshani, A., Hydrophobic sand treated with wax blend. Google Patents: 2007.
2. Method for preparing hydrophobic sand by taking paraffin and waste polyethylene plastic as raw materials. Google Patents: 2015.
3. Thermal insulation water-proof sand and producing technique thereof. Google Patents: 2003.
4. Beermann, N., Rigid sand body, method for producing the same, use thereof and method for producing grains of sand coated in wax. Google Patents: 2001.
5. Ogawa, K.; Hirasawa, Y.; Oshima, T.; Nishimura, Y., Artificial soil structure and a method of preventing land desertification using the same. Google Patents: 1996.
6. Hydrophobic sand preparation method adopting wax and sand as raw materials. Google Patents: 2013.
7. Salem, M. A.; Al-Zayadneh, W.; Cheruth, A. J., Water Conservation and Management with Hydrophobic Encapsulation of Sand. *Water Resources Management* 2010, 24 (10), 2237-2246.
8. Compound construction waterproof powder and its production method. Google Patents: 1993.
9. Heat-insulating hydrophobic powder and production thereof. Google Patents: 1992.
10. Granular water-proof heat-insulation building material. Google Patents: 1999.
11. Lamoreaux, M. A., Soil mixture and method of making same. Google Patents: 1990.
12. 一种以石蜡的甲苯溶液和沙子为 原料制备憎水沙的方法 A toluene solution of paraffin and sand as raw material preparation method of the hydrophobic sand. Google Patents: 2015.
13. de Gennes, P.-G., Brodchard-Wyart, F., Quere, D., Capillarity and Wetting Phenomena. Drops, Bubbles, Pearls, Waves. Springer; 2004 edition: 2003.
14. Prakash, P. J.; Stenchikov, G.; Kalenderski, S.; Osipov, S.; Bangalath, H., The impact of dust storms on the Arabian Peninsula and the Red Sea. *Atmospheric Chemistry and Physics* 2015, 15 (1), 199-222.
15. Hydrophobic sand preparation method adopting waste polystyrene foam as raw material. Google Patents: 2013.
16. Adhikari, R.; Bristow, K. L.; Casey, P. S.; Freischmidt, G.; Hornbuckle, J. W., Novel sprayable biodegradable polymer membrane to minimise soil evaporation. 2015 *International Conference on Technology for Sustainable Development (Ictsd-*2015) 2015.
17. Kasirajan, S.; Ngouajio, M., Polyethylene and biodegradable mulches for agricultural applications: a review. *Agronomy for Sustainable Development* 2012, 32 (2), 501-529.
18. Hillel, D., Introduction to Soil Physics. Academic Press: 1982.
19. Kaufman, Y.; Chen, S. Y.; Mishra, H.; Schrader, A. M.; Lee, D. W.; Das, S.; Donaldson, S. H.; Israelachvili, J. N., Simple-to-Apply Wetting Model to Predict Thermodynamically Stable and Metastable Contact Angles on Textured/Rough/Patterned Surfaces. *Journal of Physical Chemistry C* 2017, 121 (10), 5642-5656.
20. Bilskie, J., Soil water status: content and potential. *Campbell Scientific, Inc.* 2001.

21. McHale, G.; Newton, M., Liquid marbles: topical context within soft matter and recent progress. *Soft Matter* 2015, 11 (13), 2530-2546.
22. Janardan, N.; Panchagnula, M. V.; Bormashenko, E., Liquid marbles: Physics and applications. *Sadhana* 2015, 40 (3), 653-671.
23. Atlas, R. M., Microbial-Degradation of Petroleum-Hydrocarbons—an Environmental Perspective. *Microbiological Reviews* 1981, 45 (1), 180-209.

The invention claimed is:

1. A modified composition of sand or soil that acts as mulch, comprising:
  one or more particles of sand or soil, wherein the one or more particles have a size which is 600 μm or less; and
  a hydrophobic layer coating each of the one or more particles of sand or soil,
  wherein the hydrophobic layer includes a hydrophobic substance, and a ratio of (1) an entirety of the hydrophobic substance making up the hydrophobic layer and (2) the one or more particles of sand or soil is between 1:300 to 1:1000 by weight so that water does not penetrate through the modified composition of sand or soil after one week.

2. The composition of claim 1, wherein the hydrophobic layer and one or more particles of sand or soil have a liquid roll off angle of about 3 to 7 degrees.

3. The composition of claim 1, wherein the one or more particles of sand or soil comprises $SiO_2$, $CaCO_3$, $Al_2O_3$, $Fe_2O_3$, $TiO_2$, $P_2O_5$, $K_2O$, $CaO$, $MgO$, $Na_2O$ or $MnO_2$.

4. The composition of claim 1, wherein the one or more particles of sand are beach sand or desert sand and one or more particles of soil are silt or clay soils.

5. The composition of claim 1, wherein the hydrophobic substance includes only a single hydrophobic material.

6. The composition of claim 1, wherein the hydrophobic layer is wax, and the wax is selected from the group consisting of common wax, paraffin wax, palm wax, bees wax, and soy wax, individually or in combination.

7. The composition of claim 1, wherein the hydrophobic layer has a thickness of 20 nm.

8. A method of reducing irrigation requirements for an agricultural system, comprising:
  providing a mulch that includes one or more particles of sand or modified soil, wherein the one or more particles have a size which is 600 μm or less, and each of the one or more particles is coated with a hydrophobic layer having a hydrophobic substance, and a ratio of (1) an entirety of the hydrophobic substance making up the hydrophobic layer and (2) the one or more particles of sand or soil is between 1:300 to 1:1000 by weight so that water does not penetrate through the modified composition of sand or soil after one week; and
  distributing the mulch on one or more apexes of a soil for preventing water evaporation from the soil.

9. The method of claim 8, further comprising:
  distributing the mulch on a homogenous layer of 1 mm to 10 cm on top of the soil; and
  irrigating the soil.

10. A modified composition of sand or soil that acts as mulch, comprising:
  one or more particles of sand or soil, wherein the one or more particles have a size which is 600 pm or less; and
  a hydrophobic layer individually coating each of the one or more particles of sand or soil,
  wherein the hydrophobic layer around each of the one or more particles of sand or soil includes a hydrophobic substance, and a ratio of (1) an entirety of the hydrophobic substance making up the hydrophobic layer and (2) the one or more particles of sand or soil is between 1:300 to 1:1000 by weight so that water does not penetrate through the modified composition of sand or soil after one week.

11. The composition of claim 10, wherein the hydrophobic layer and the one or more particles of sand or soil have a liquid roll off angle of about 3 to 7 degrees.

12. The composition of claim 10, wherein the one or more particles of sand or soil comprises $SiO_2$, $CaCO_3$, $Al_2O_3$, $Fe_2O_3$, $TiO_2$, $P_2O_5$, $K_2O$, $CaO$, $MgO$, $Na_2O$ or $MnO_2$.

13. The composition of claim 10, wherein the one or more particles of sand are beach sand or desert sand and one or more particles of soil are silt or clay soils.

14. The composition of claim 10, wherein the hydrophobic substance includes only a single hydrophobic material.

15. The composition of claim 10, wherein the hydrophobic layer is wax, and the wax is selected from the group consisting of common wax, paraffin wax, palm wax, bees wax, and soy wax, individually or in combination.

16. The composition of claim 10, wherein the hydrophobic layer has a thickness of 20 nm.

* * * * *